(12) United States Patent
Muramatsu

(10) Patent No.: US 8,411,808 B2
(45) Date of Patent: Apr. 2, 2013

(54) INFORMATION PROCESSING DEVICE, RECEIVING METHOD, AND WIRELESS COMMUNICATION SYSTEM

(75) Inventor: Hirotaka Muramatsu, Tokyo (JP)

(73) Assignee: Sony Corporation (JP)

( * ) Notice: Subject to any disclaimer, the term of this patent is extended or adjusted under 35 U.S.C. 154(b) by 132 days.

(21) Appl. No.: 13/114,236

(22) Filed: May 24, 2011

(65) Prior Publication Data

US 2011/0292991 A1    Dec. 1, 2011

(30) Foreign Application Priority Data

May 31, 2010    (JP) ................................ P2010-125023

(51) Int. Cl.
*H04L 7/00* (2006.01)
(52) U.S. Cl. ........ 375/354; 375/231; 375/355; 375/361; 370/503; 341/68
(58) Field of Classification Search .................. 375/145, 375/149, 229, 231, 232, 282, 354, 355, 361, 375/368, 375; 341/68, 69, 70; 370/503, 370/509, 512, 514
See application file for complete search history.

(56) References Cited

U.S. PATENT DOCUMENTS 7,408,996 B2 *   8/2008   Hershbarger et al. ......... 375/258
7,450,666 B2    11/2008   Miyanaga et al.
8,259,785 B2 *   9/2012   Ooi ............................... 375/232
2008/0013617 A1  1/2008   Ooi
2010/0134256 A1* 6/2010   Mihota ........................ 340/10.1

FOREIGN PATENT DOCUMENTS

| JP | 11-146022 A | 5/1999 |
| JP | 11-251916 A | 9/1999 |
| JP | 2004-064681 A | 2/2004 |
| JP | 2005-160042 A | 6/2005 |
| JP | 2008-022422 A | 1/2008 |
| JP | 2008-027270 A | 2/2008 |

* cited by examiner

*Primary Examiner* — Dac Ha
(74) *Attorney, Agent, or Firm* — Lerner, David, Littenberg, Krumholtz & Mentlik, LLP

(57) ABSTRACT

There is provided an information processing device, including a preamble detection portion, a sync detection portion, a storage portion, a storage control portion, a delay time imparting portion, a bias computation portion, a half sampling portion, an adaptive equalization portion an equalization performance determination portion that compares equalization errors for each one of the sync portion candidates for which the training equalization has been performed by the adaptive equalization portion, and that sets the candidate position with the least error, and a binary determination portion that decodes the Manchester code into NRZ code by subjecting to binary determination the received signal that has been adaptively equalized by the adaptive equalization portion. The storage control portion reads the received signal from the storage portion based on information about the candidate position with the least error that has been set by the equalization performance determination portion.

7 Claims, 16 Drawing Sheets

INFORMATION PROCESSING DEVICE, RECEIVING METHOD, AND WIRELESS COMMUNICATION SYSTEM

CROSS-REFERENCE TO RELATED APPLICATION

The present application claims priority from Japanese Patent Application No. JP 2010-125023 filed in the Japanese Patent Office on May 31, 2010, the entire content of which is incorporated herein by reference.

BACKGROUND OF THE INVENTION

1. Field of the Invention

The present invention relates to an information processing device, a receiving method, and a wireless communication system.

2. Description of the Related Art

Non-contact communication is a wireless technology that performs data transmission over distances ranging from zero to several centimeters and is used, for example, in an RFID system that is configured from a non-contact IC card and a reader/writer. The communication can be divided into two types, communication from the reader/writer to the card and communication from the card to the reader/writer, according to the communication direction. In this specification, the former is called downlinking, and the latter is called uplinking. In both of the communication directions, the reader/writer constantly generates a carrier frequency, and the card performs transmission processing and receiving processing based on electric power that it obtains from the carrier frequency.

Non-contact communication methods include an electrostatic coupling method, an electromagnetic induction method, a radio communication method, and the like. Of these methods, the electromagnetic induction method performs data communication by magnetic coupling between a primary coil in the reader/writer and a secondary coil in the card (that is, the two coils operate as an LC resonance circuit). The reader/writer performs the downlink data transmission by performing amplitude modulation of a magnetic field, that is, the carrier, that is generated by the primary coil, and the carrier is detected by the card. In contrast, load modulation is used for the uplink, and the load resistance of the secondary coil is switched based on transmission information in the card. In the reader/writer, the electromagnetically coupled input impedance varies as the load of the electromagnetically coupled secondary coil varies, causing the output level of the carrier frequency to vary. It is therefore possible for transmission information to be read by the card by looking at the changes in the output level.

For example, ISO/IEC IS 18092 (NFC IP-1), which became an international standard in December, 2003, is the non-contact communication standard that governs the specifications of the reader/writer. This standard is the successor to the standard originally used for the Sony Felica (registered trademark) and the Philips Mifare, which became widely used as non-contact IC cards. In the Felica format, Manchester encoding is used, and both the downlink and the uplink use the same packet structure. The packet structure for the Felica format is shown in FIG. 17. The packet that is shown is configured in three parts: preamble, sync, and data. The preamble is a sequence of zeroes six bytes long, and the sync is a known two-byte sequence, "0xB24D". The data part includes a one-byte LEN that indicates the packet length, the data proper (the payload) in a number of bytes equal to (LEN-1), and a two-byte cyclic redundancy check (CRC) code. The three parts are all Manchester encoded.

In this case, for example, the Manchester encoding changes from a low level to a high level in the middle of the bit period when a binary "0" is transmitted (changing input "0" to "01") and, conversely, changes from a high level to a low level in the middle of the bit period when a binary "1" is transmitted (changing input "1" to "10"). In other words, it is a coding format that divides a single bit period into a front cell and a rear cell, expressing a logical value "0" when the front cell is at a low level and the rear cell is at a high level, and expressing a logical value "1" when the front cell is at a high level and the rear cell is at a low level. It can also be said that the Manchester encoding converts a single input bit into two bits (or transmits a single bit in two pulses (2 T)), with the communication rate being halved by doubling the bandwidth, but the direct current component being eliminated from the transmitted signal.

The six bytes of zeroes in the preamble portion are Manchester encoded. Therefore, "01" is transmitted forty-eight times in a sequential waveform. The "0xB24D" in the sync portion is also Manchester encoded. In the data portion, the transmitted information, the length information (LEN), and the CRC are Manchester encoded as a group.

On the packet recognize side, a clock (sampling timing) is extracted based on the preamble portion, which is a sequential waveform. In this specification, this operation is called timing synchronization. Next, the sync portion, whose pattern is the Manchester encoded "0xB24D", is detected, and the starting position of the data portion that follows it is extrapolated. In this specification, this operation is called frame synchronization. Next, the data portion is decoded based on the starting position.

Any number of proposals have been made for a receiving circuit that decodes the Manchester code into a non-return-to-zero (NRZ) code (for example, refer to Japanese Patent Application Publication No. JP-A-11-146022, Japanese Patent Application Publication No. JP-A-11-251916, and Japanese Patent Application Publication No. JP-A-2005-160042).

Incidentally, the communication rates that are prescribed for the Felica format are all multiples of 212 kbps, such as 424 kbps, 848 kbps, 1.7 Mbps, 3.4 Mbps, and the like. As the communication rate increases, the frequency bandwidth of the transmission signal becomes wider in proportion to the communication rate. As the frequency bandwidth of the signal becomes wider, the effects of the frequency characteristics of the transmission route, the transmission RF analog circuit, and the receiving RF analog circuit increase. Generally, the frequency characteristics attenuate more as the frequency becomes higher. The phase characteristics also become more irregular as the frequency becomes higher. This means that the received waveform becomes more irregular as the communication rate for the signal increases.

One method for compensating for the irregularity of the received signal in high-speed communication and the like is adaptive equalization processing (for example, refer to Japanese Patent Application Publication No. JP-A-2004-64681, Japanese Patent Application Publication No. JP-A-2008-22422, and Japanese Patent Application Publication No. JP-A-2008-27270). An adaptive equalization circuit may be configured from a finite impulse response (FIR) filter and a learning circuit. FIG. 18 is an explanatory figure that schematically shows a configuration of a FIR filter. The FIR filter is provided with a delay line in which a plurality of delay elements are connected in series. The FIR filter is able to produce an equalized signal by taking a time series of data inputs, the number of which is equal to the number of the arrayed delay elements, using a multiplier to perform weighting of the data inputs with a tap coefficient that corresponds to the filter characteristics, then performing processing that averages the cumulative total of the data inputs. A known learning signal is transmitted from the transmission side to the receiving side. Ordinarily, a random pattern is used for the learning signal. The learning circuit on the receiving side adjusts the tap coefficient of the filter such that when an irregular learning signal is received through the transmission route, the equalized signal that is output from the FIR filter comes close to the desired signal.

In the performing of the adaptive equalization, a random pattern must be transmitted that is of sufficient length for the tap coefficient of the FIR filter to be learned. At the same time, in order for the data portion within the packet to be decoded from the start, it is necessary for the learning of the FIR filter to be completed at a prior stage.

A method that inserts a random pattern of sufficient length for learning between the sync portion and the data portion, a method that transmits a special packet for learning before the ordinary packet, and the like are conceivable as ways to complete the learning of the FIR filter at a stage prior to the arrival of the data portion. However, the implementing of these methods has the potential to create a problem with interchangeability, because the packet format is used that is different from the Felica format that is prescribed by the NFC IP-1 standard. Furthermore, the time for transmitting information is reduced in order to make time to transmit the random pattern for learning, which is a known signal, thus leading to a drop in the communication rate.

Accordingly, a method for performing adaptive equalization has been proposed that uses the existing packet format of the Felica format in order to improve the adaptive equalization performance. Specifically, the method uses the sync portion of the packet, which is a known signal sequence, for the adaptive equalization learning on the receiving side. However, in the packet format of the Felica format, the number of Manchester encoded bits in the sync portion is at most 32 bits, so the number of learning cycles is not really adequate.

For the method for performing adaptive equalization that uses the existing packet format of the Felica format, a method has been proposed that, for example, performs the learning of the front half of the sync portion at high speed and performs the learning of the rear half of the sync portion at low speed, in order to implement the adaptive equalization learning with little convergence error at high speed.

However, in order to produce favorable learning results by the start of the data portion, it is necessary to restrict the number of the FIR filter taps to several taps. On the other hand, if there are few FIR filter taps, it is difficult to describe the frequency characteristics with precision, so a problem arises, because in some cases, depending on the effects of the frequency characteristics that are received through the transmission route, sufficiently good receiving characteristics will not be achieved, even if adaptive equalization is performed.

For example, in a case where the communication rate is 3.4 Mbps, the Manchester encoded channel rate is 6.8 Mbps, and the bandwidth for the baseband signal is 6.8 MHz. Furthermore, the shortest wave (1 T) in the Manchester encoded signal is 3.4 MHz, and the longest wave (2 T) is 1.7 Mhz, so the signal spectrum is 3.4 MHz, distributed around a center of 1.7 MHz. In this case, when the number of the taps of the FIR filter is five, it is possible to describe five frequency positions within the 6.8 MHz baseband bandwidth. However, only one frequency position that can be controlled exists between 1 T and 2 T. Therefore, in a case where the frequency characteristics of the transmission route between 1 T and 2 T are complex, it is difficult to describe the inverse characteristics of the frequency characteristics and difficult to perform the equalization well.

Thus, in a non-contact communication system that utilizes electromagnetic coupling, in order to make the system compatible with a faster transmission rate while conforming to the Felica format, the adaptive equalization must improve more complex frequency characteristics with a low number of FIR filter taps.

Accordingly, a method has also been proposed that improves the receiving performance, while using the same number of FIR filter taps, by computing the bias of the received signal, performing adaptive equalization of a half sampled signal, and performing a binary determination.

SUMMARY OF THE INVENTION

However, with the method that computes the bias of the received signal, performs the adaptive equalization of the half sampled signal, and performs the binary determination, it sometimes happens that the equalization performance is impaired if a detected synchronization position shifts due to the effects of the frequency characteristics of the transmission route, creating a problem in that the receiving performance becomes worse.

In light of the foregoing, it is desirable to provide a novel and improved an information processing device, a receiving method, and a wireless communication system that are new and improved and that are capable of preventing the worsening of the receiving performance, even in a case where the frequency characteristics of the transmission route exert an influence, by selecting a plurality of the synchronization positions and performing a sync portion training equalization for each of the synchronization positions, in a case where the bias of the received signal is computed, the adaptive equalization of the half sampled signal is performed, and the binary determination is performed.

According to an embodiment of the present invention, there is provided an information processing device, including a preamble detection portion that detects, within a received signal, a preamble portion that includes a sequential waveform, and that extracts a sampling timing based on the sequential waveform, a sync detection portion that, based on the sampling timing, detects within the received signal a plurality of sync portion candidates that include a specific pattern that fulfills a specified condition, and that outputs a timing signal that indicates a starting position of the sync portion, a storage portion that stores the received signal, a storage control portion that controls the storing of the received signal in the storage portion and reading of the received signal from the storage portion, a delay time imparting portion that imparts a delay to the received signal that the storage control portion reads from the storage portion, such that the beginning of the sync portion is not output until the detection of the sync portion by the sync detection portion has been determined, a bias computation portion that computes a difference between the received signal to which the delay has been imparted by the delay time imparting portion and the received signal to which an additional delay time has been imparted that is equivalent to one clock cycle in Manchester code, a half sampling portion that samples data once out of every two clock cycles in the Manchester code, starting from the beginning of the sync portion for which the bias has been computed by the bias computation portion, an adaptive equalization portion that, based on the timing signal, performs training equalization using each one of the half sampled sync portion candidates, an equalization performance determination portion that compares equalization errors for each one of the sync portion candidates for which the training equalization has been performed by the adaptive equalization portion, and that sets the candidate position with the least error, and a binary determination portion that decodes the Manchester code into NRZ code by subjecting to binary determination the received signal that has been adaptively equalized by the adaptive equalization portion. The storage control portion reads the received signal from the storage portion based on information about the candidate position with the least error that has been set by the equalization performance determination portion.

The adaptive equalization portion may perform adaptive equalization of a data portion that is contained in the received signal and that includes a specific pattern, based on the information about the candidate position with the least error that has been set by the equalization performance determination portion.

The sync detection portion may detect, as the sync portion candidates, a plurality of sampled positions that are adjacent to one another.

The sync detection portion may detect, as the sync portion candidates, a plurality of sampled positions that are spaced at even-numbered intervals.

The adaptive equalization portion may perform training equalization that trains a tap coefficient of a FIR filter.

According to another embodiment of the present invention, there is provided a receiving method, including the steps of detecting, within a received signal, a preamble portion that includes a sequential waveform, and extracting a sampling timing based on the sequential waveform, detecting within the received signal, based on the sampling timing, a plurality of sync portion candidates that include a specific pattern, and outputting a timing signal that indicates a starting position of the sync portion, storing the received signal, imparting a delay to the received signal, such that the beginning of the sync portion is not output until the detection of the sync portion has been determined, computing a difference between the received signal to which the delay has been imparted and the received signal to which an additional delay time has been imparted that is equivalent to one clock cycle in Manchester code, sampling data once out of every two clock cycles in the Manchester code, starting from the beginning of the sync portion for which the bias has been computed, performing training equalization using each one of the half sampled sync portion candidates, based on the timing signal, comparing equalization errors for each one of the sync portion candidates for which the training equalization has been performed, and setting the candidate position with the least error, reading the stored received signal based on the candidate position with the least error that has been set, and subjecting to binary determination the received signal that has been read and adaptively equalized, such that the Manchester code is decoded into NRZ code.

According to another embodiment of the present invention, there is provided a wireless communication system, including a reader/writer, and an information processing device that performs non-contact communication with the reader/writer by using a carrier wave of a specified frequency. At least one of the reader/writer and the information processing device includes a preamble detection portion that detects, within a received signal, a preamble portion that includes a sequential waveform, and that extracts a sampling timing based on the sequential waveform, a sync detection portion that, based on the sampling timing, detects within the received signal a plurality of sync portion candidates that include a specific pattern that fulfills a specified condition, and that outputs a timing signal that indicates a starting position of the sync portion, a storage portion that stores the received signal, a storage control portion that controls the storing of the received signal in the storage portion and reading of the received signal from the storage portion, a delay time imparting portion that imparts a delay to the received signal that the storage control portion reads from the storage portion, such that the beginning of the sync portion is not output until the detection of the sync portion by the sync detection portion has been determined, a bias computation portion that computes a difference between the received signal to which the delay has been imparted by the delay time imparting portion and the received signal to which an additional delay time has been imparted that is equivalent to one clock cycle in Manchester code, a half sampling portion that samples data once out of every two clock cycles in the Manchester code, starting from the beginning of the sync portion for which the bias has been computed by the bias computation portion, an adaptive equalization portion that, based on the timing signal, performs training equalization using each one of the half sampled sync portion candidates, an equalization performance determination portion that compares equalization errors for each one of the sync portion candidates for which the training equalization has been performed by the adaptive equalization portion, and that sets the candidate position with the least error, and a binary determination portion that decodes the Manchester code into NRZ code by subjecting to binary determination the received signal that has been adaptively equalized by the adaptive equalization portion. The storage control portion reads the received signal from the storage portion based on information about the candidate position with the least error that has been set by the equalization performance determination portion.

The present invention provides an information processing device, a receiving method, and a wireless communication system that are new and improved and that are capable of preventing the worsening of the receiving performance, even in a case where the frequency characteristics of the transmission route exert an influence, by selecting a plurality of the synchronization positions and performing a sync portion training equalization for each of the synchronization positions, in a case where the bias of the received signal is computed, the adaptive equalization of the half sampled signal is performed, and the binary determination is performed, as described above.

DETAILED DESCRIPTION OF EMBODIMENT

Figure 1:
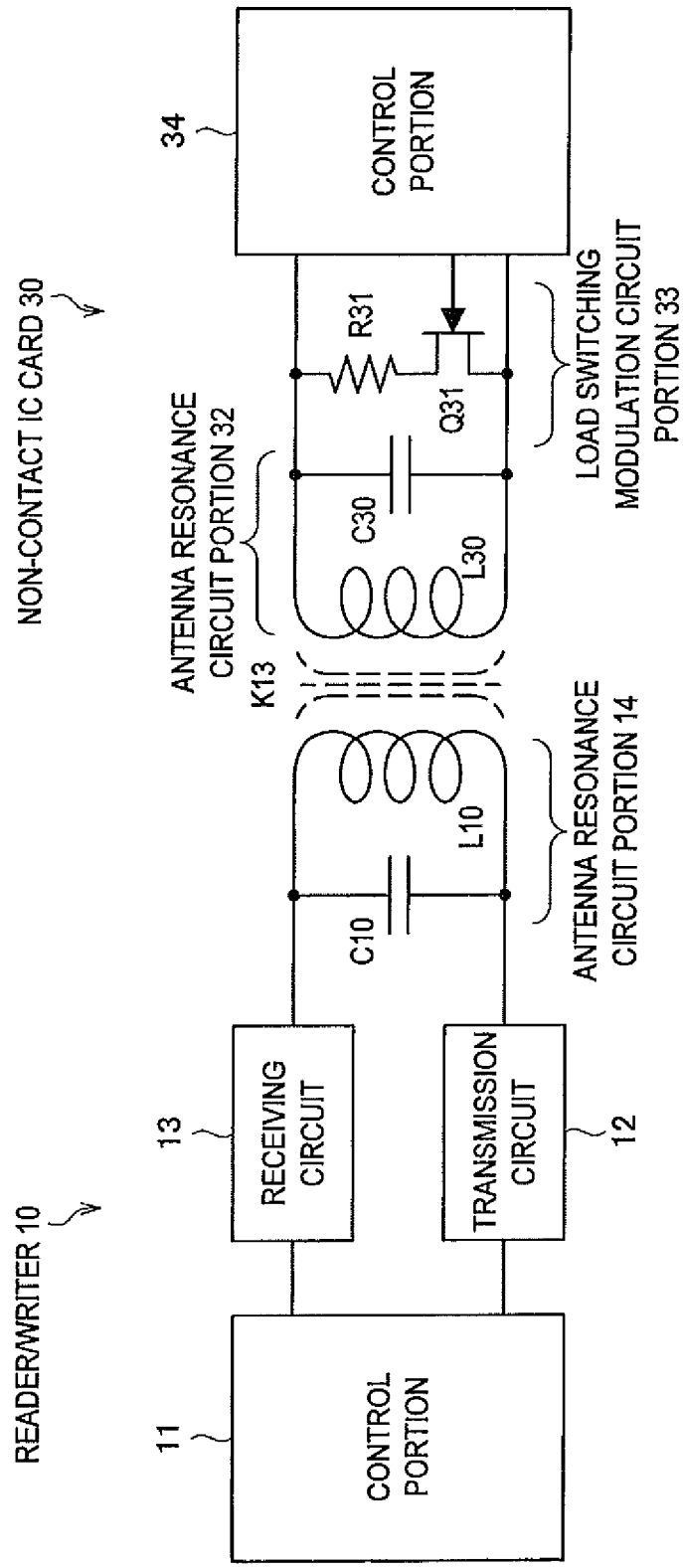
FIG. 1 is an explanatory figure that shows a configuration of a non-contact communication system 1 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the explanation will be in the order shown below.
1 Embodiment of the present invention
1-1. Example configuration of non-contact communication system
1-2. Data transmission and receiving processing in the non-contact communication system
1-3. Configuration of receiving circuit
1-4. Operation of receiving circuit
2. Conclusion 1. Embodiment of the Present Invention 1-1. Example Configuration of Non-Contact Communication System First, the configuration of a non-contact communication system according to an embodiment of the present invention will be explained. FIG. 1 is an explanatory figure that shows the configuration of a non-contact communication system 1 according to the embodiment of the present invention. Hereinafter, the configuration of the non-contact communication system 1 according to the embodiment of the present invention will be explained using FIG. 1.

As shown in FIG. 1, the non-contact communication system 1 according to the embodiment of the present invention is configured such that it includes a reader/writer 10 and a non-contact IC card 30. Packets in a Felica format, for example, are exchanged between the reader/writer 10 and the non-contact IC card 30 by a specified communication procedure.

The reader/writer 10 is configured from a control portion 11, a transmission circuit 12, a receiving circuit 13, and an antenna resonance circuit portion 14. For its part, the non-contact IC card 30 is configured from a control portion 34, an antenna resonance circuit portion 32, and a load switching modulation circuit portion 33. In the example that is shown in FIG. 1, the control portion 34 is configured such that it includes a transmission circuit, a receiving circuit, a logic circuit, and a non-volatile memory such as an electrically erasable and programmable read-only memory (EEPROM) or the like.

The control portion 11 controls the various portions of the reader/writer 10 and performs processing that transmits and receives data. The transmission circuit 12 is provided with a carrier oscillator (not shown in the drawings), and when it transmits data through a downlink, it Manchester encodes the transmission data, then transmits the data by modulating the amplitude of the carrier, for example. The transmission circuit 12 continues to transmit the carrier even when the reader/writer 10 is receiving data through an uplink.

The antenna resonance circuit portion 14 in the reader/writer 10 is configured from a parallel resonance circuit that includes a coil $L_{10}$ and a capacitor $C_{10}$ and operates as a primary coil. The resonance frequency is set close to the carrier frequency that is generated by the transmission circuit 12.

For its part, the antenna resonance circuit portion 32 in the non-contact IC card 30 is configured from a coil $L_{30}$ and a capacitor $C_{30}$ and operates as a secondary coil. The resonance frequency of the antenna resonance circuit portion is set to a specified value in accordance with the capacitance of the capacitor $C_{30}$ and the inductance of the coil $L_{30}$. Ordinarily, the antenna resonance circuit portion 32 is electromagnetically coupled to the antenna resonance circuit portion 14 in the reader/writer 10 by setting the resonance frequency of the antenna resonance circuit portion 32 close to the carrier frequency. The coil $L_{10}$ and the coil $L_{30}$ are electromagnetically coupled with a coupling coefficient K13 whose value increases as the positions of the two coils move closer together.

The load switching modulation circuit portion 33 is connected in parallel to the antenna resonance circuit portion 32. The load switching modulation circuit portion 33 is configured from a transistor switch $Q_{31}$ that includes a resistor $R_{31}$ and a metal oxide semiconductor (MOS) that are connected in series, and load modulation for the antenna resonance circuit portion 32 is performed by turning the transistor switch $Q_{31}$ on and off.

During data receiving through a downlink, the antenna resonance circuit portion 32 supplies to the control portion 34 a signal that is received from the antenna resonance circuit portion 14 in the reader/writer 10. In the control portion 34, the received signal is demodulated, and the original transmission data are then restored by performing Manchester decoding processing. Note that in order to compensate for irregularities in the signal that is received by high-speed communication or the like, adaptive equalization processing must be performed before the Manchester decoding, but this point will be explained in detail later.

Furthermore, during data transmission through an uplink, the control portion 34 Manchester encodes the transmission data. The carrier is continuously transmitted from the reader/writer 10, generating a magnetic field in the coil $L_{30}$ of the antenna resonance circuit portion 32. In accordance with the Manchester encoded bit sequence of 1's and 0's that is supplied by the control portion 34, the load switching modulation circuit portion 33 performs load modulation of the magnetic field according to the transmission data by switching the MOS switch $Q_{31}$ on and off. The data are thus transmitted to the antenna resonance circuit portion 14 of the reader/writer 10.

When the load changes in the electromagnetically coupled secondary coil $L_{30}$, the input impedance of the electromagnetic coupling changes in the reader/writer 10, so the output level of the carrier frequency changes. The receiving circuit 13 is therefore able to read the transmission data from the non-contact IC card 30 by looking at the changes in the level. Once the receiving circuit 13 restores the original transmission data by performing Manchester decoding processing, it passes the transmission data to the control portion 11. Note that in order to compensate for irregularities in the signal that is received by high-speed communication or the like, adaptive equalization processing must be performed before the Manchester decoding, but this point will be explained in detail later.

The configuration of the non-contact communication system 1 according to the embodiment of the present invention has been explained using FIG. 1. Next, data transmission and receiving processing in the non-contact communication system 1 that is shown in FIG. 1 will be explained.

Figure 2:
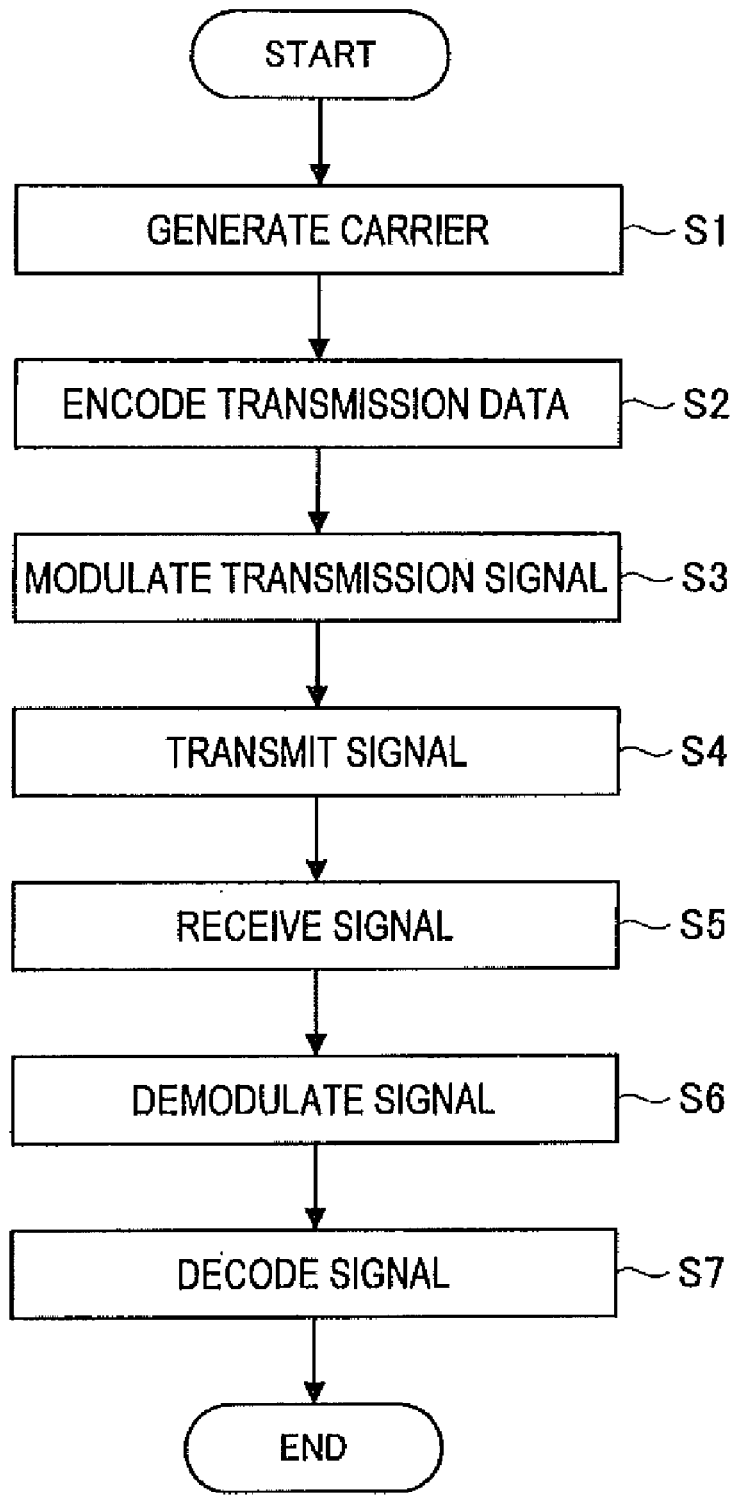
FIG. 2 is a flowchart of data transmission and receiving processing in the non-contact communication system 1 that is shown in FIG. 1.
Figure 3:
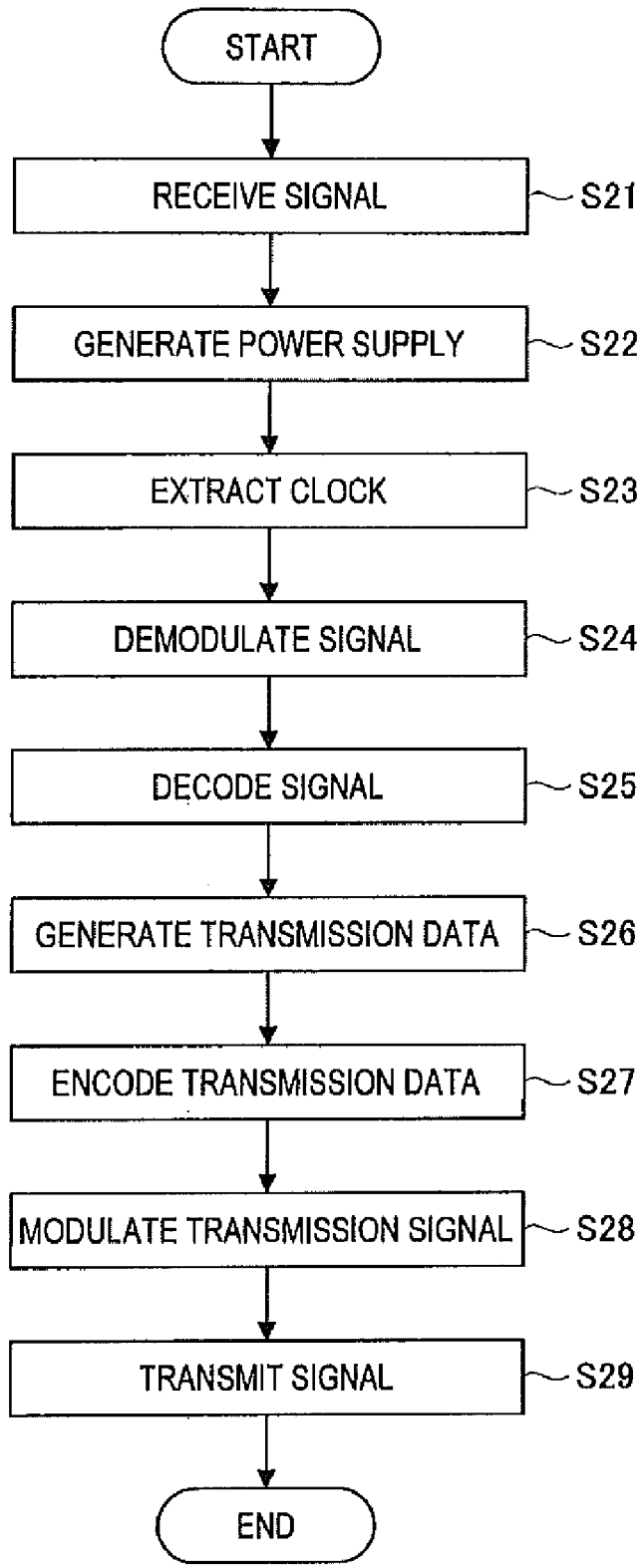
FIG. 3 is a flowchart of data transmission and receiving processing in the non-contact communication system 1 that is shown in FIG. 1.

1-2. Data Transmission and Receiving Processing in the Non-Contact Communication System FIGS. 2 and 3 are flowcharts of the data transmission and receiving processing in the non-contact communication system 1 that is shown in FIG. 1. Hereinafter, the data transmission and receiving processing in the non-contact communication system 1 that is shown in FIG. 1 will be explained using FIGS. 2 and 3. Note that the flowchart in FIG. 2 shows a processing procedure that the reader/writer 10 performs, and the flowchart in FIG. 3 shows a processing procedure that the non-contact IC card 30 performs.

The transmission circuit 12 in the reader/writer 10 generates the carrier frequency (Step S1).

The transmission circuit 12 acquires the transmission data from the control portion 11 and encodes the data in the Manchester code (Step S2).

Next, the transmission circuit 12, based on the encoded data, performs amplitude modulation of the carrier that was generated at Step S1 (Step S3).

The modulated signal that was amplitude modulated at Step S3 is supplied to the antenna resonance circuit portion 14 (Step S4). The antenna resonance circuit portion then generates a magnetic field in accordance with the modulated signal that is supplied.

Magnetic coupling by the magnetic field that was generated at Step S4 causes an electromotive force to be induced in the antenna resonance circuit portion 32 in the non-contact IC card 30 (Step S21).

The non-contact IC card 30 is provided with an IC power supply generation circuit (not shown in the drawings), and based on the electromotive force that was induced at Step S21, a power supply circuit is formed that supplies the necessary electric power to various portions (Step S22). The non-contact IC card 30 also extracts a clock component from the electromotive force that was induced at Step S21 (Step S23).

The receiving circuit in the control portion 34 performs demodulation processing of the amplitude modulated signal, based on voltage amplitude changes in the electromotive force that was induced at Step S21 (Step S24).

The signal that was demodulated at Step S24 has been encoded in the Manchester code. The receiving circuit in the control portion 34 performs Manchester decoding of the demodulated signal (Step S25). Note that in order to compensate for irregularities in the signal that is received by high-speed communication or the like, adaptive equalization processing must be performed before the Manchester decoding, but this point will be explained in detail later.

In accordance with a specified program that is set in advance, the logic circuit in the control portion 34 (not shown in the drawings) causes the decoded data to be stored in a non-volatile manner in the EEPROM (not shown in the drawings) or the like, and at least one of reads and deletes the data that are stored in a non-volatile manner. Data to be transmitted to the reader/writer 10 are also created by the logic circuit (Step S26).

An encoding/decoding circuit 39 encodes in the Manchester code the data for transmission that were created at Step S26 and supplies the encoded data to the load switching modulation circuit portion 33 (Step S27).

The carrier continues to be transmitted from the reader/writer 10, so a magnetic field is generated in the coil $L_{30}$ of the antenna resonance circuit portion 32. The load switching modulation circuit portion 33 performs load modulation of the magnetic field by switching the MOS switch $Q_{31}$ on and off in accordance with the bit sequence of the Manchester encoded data, such that the impedance of the antenna resonance circuit portion 32 is varied (Step S28). Thus the Manchester encoded data are transmitted to the antenna resonance circuit portion 14 of the reader/writer 10 (Step S29).

The unmodulated carrier is flowing through the antenna resonance circuit portion 14 of the reader/writer 10, and voltage amplitude variations in the carrier are induced in accordance with the impedance variations that were created at Step S28. By detecting the amplitude variations, the antenna resonance circuit portion 14 receives the signal from the non-contact IC card 30 (Step S5).

The receiving circuit 13 demodulates the load modulated signal based on the voltage amplitude variations in the carrier that were induced at Step S5 (Step S6). The demodulated signal is Manchester encoded, so the receiving circuit 13 also Manchester decodes the demodulated signal (Step S7) to restore the transmission data, which it then supplies to the control portion 11. Note that in order to compensate for irregularities in the signal that is received by high-speed communication or the like, adaptive equalization processing must be performed before the Manchester decoding (as described above).

Figure 17:
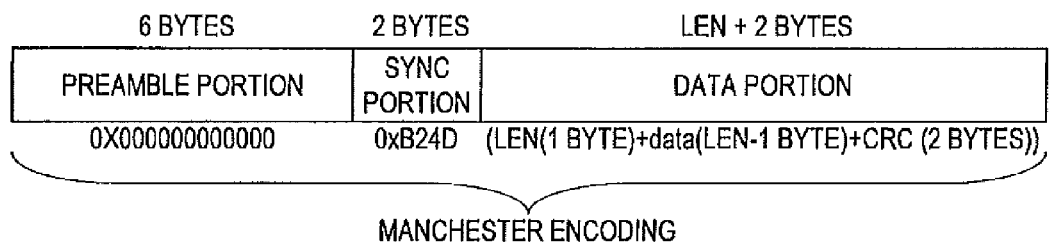
FIG. 17 is an explanatory figure that shows a packet structure of a Felica format.
Figure 18:
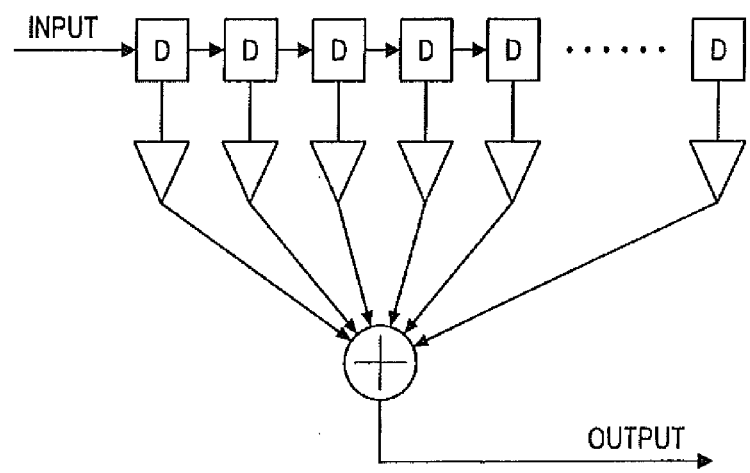
FIG. 18 is an explanatory figure that schematically shows a configuration of a FIR filter.

As previously noted, the Manchester code is used in the Felica format, and the same packet format (refer to FIG. 17) is used for both the downlink and the uplink.

Furthermore, if the communication rate between the reader/writer 10 and the non-contact IC card 30 is increased to one of 424 kbps, 848 kbps, 1.7 Mbps, and 3.4 Mbps, which are all multiples of 212 kbps, the frequency bandwidth for the transmission signal is widened in proportion to the communication rate, increasing the effects of the frequency characteristics of the transmission route, the transmission circuit, and a RF analog circuit within the receiving circuit and increasing the irregularities in the received waveform. In other words, in order to implement high-speed communication in non-contact communication that utilizes magnetic coupling, adaptive equalization must be performed on the receiving side in order to compensate for the deterioration of the frequency characteristics.

Accordingly, in the present embodiment, compensation for the irregularities in the received signal is achieved by using adaptive equalization in the receiving circuit of at least one of the reader/writer 10 and the non-contact IC card 30.

Performing the adaptive equalization also requires a signal sequence that is sufficiently long for learning, but if that sort of signal sequence is transmitted, the possibility exists that a problem of interchangeability with the Felica format that is prescribed by the NFC IP-1 standard will occur and that the communication rate will drop due to an increase in overhead.

Accordingly, in the present embodiment, the adaptive equalization is performed using the existing Felica format and using the sync portion of the packet as the learning bits. This makes it possible to avoid the interchangeability problem and the increase in overhead. Actually, frame synchronization that uses the sync portion and the adaptive equalization that uses the same sync portion are both implemented by providing a delay buffer within the receiving circuit.

Furthermore, in the present embodiment, in a case where a half sampled signal is adaptively equalized and a binary determination is made, a plurality of synchronization positions are selected, training equalization of the sync portion is performed for each of the synchronization positions, and tracking equalization of the data portion is performed for the synchronization position that has the least error. This makes it possible to prevent a drop in the receiving performance and to improve the receiving performance, even in a case where the frequency characteristics of the transmission route exert an influence.

1-3. Configuration of Receiving Circuit

Figure 4:
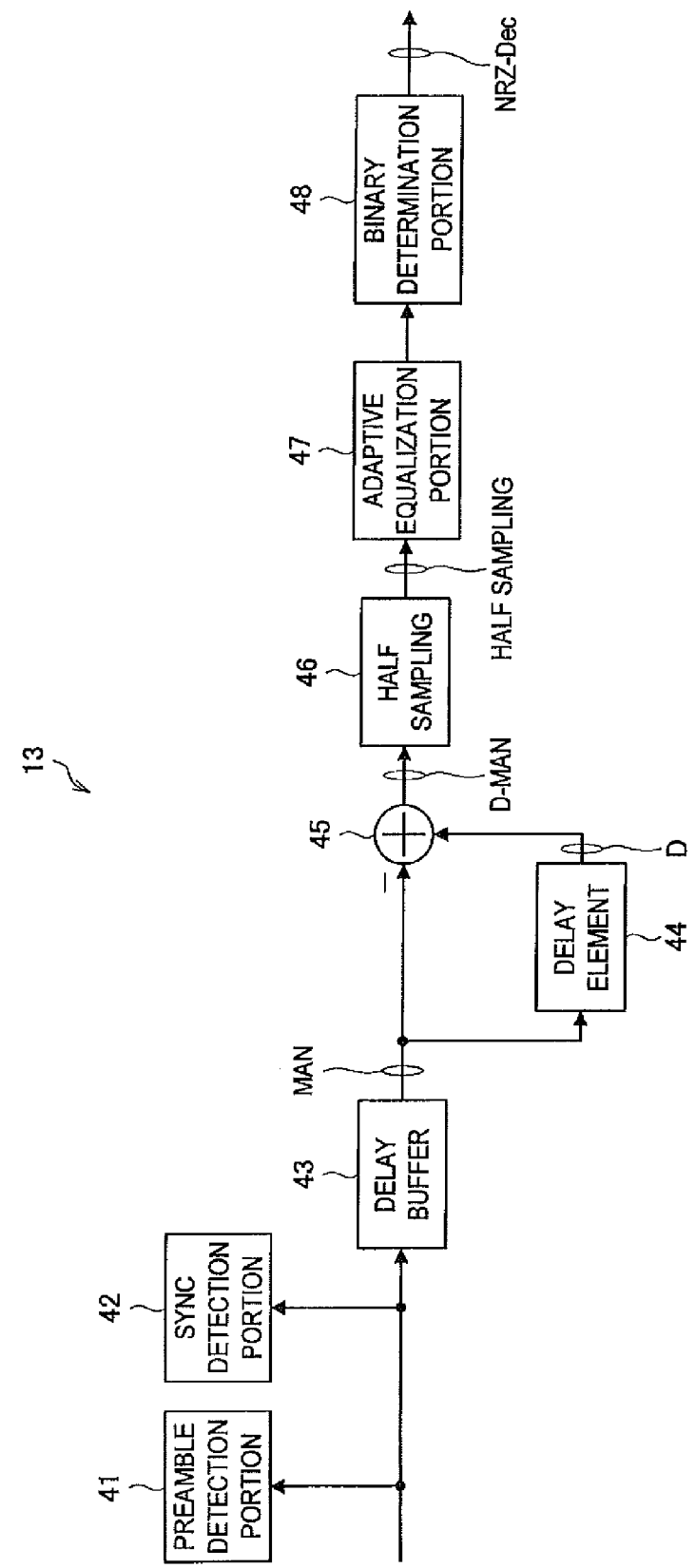
FIG. 4 is an explanatory figure that shows a configuration of a receiving circuit 13 that is contained in a reader/writer 10 according to the embodiment of the present invention.

First, the configuration of the receiving circuit in a case where a half sampled signal is adaptively equalized and a binary determination is made will be explained. FIG. 4 is an explanatory figure that shows the configuration of the receiving circuit 13 that is contained in a reader/writer 10 according to the embodiment of the present invention. Hereinafter, the configuration of the receiving circuit 13 that is contained in a reader/writer 10 according to the embodiment of the present invention will be explained using FIG. 4.

As shown in FIG. 4, the receiving circuit 13 is configured such that it includes a preamble detection portion 41, a sync detection portion 42, a delay buffer 43, a delay element 44, an adder 45, a half sampling portion 46, an adaptive equalization portion 47, and a binary determination portion 48.

The preamble detection portion 41 detects the preamble portion, which is a sequential waveform within the received signal. The preamble detection portion 41 also performs timing synchronization by extracting a sampling timing based on the sequential waveform.

The sync detection portion 42 performs the frame synchronization by detecting the sync portion, which is a specific pattern, based on the received signal and the sampling timing that has been extracted by the preamble detection portion 41. Generally, a method such as pattern matching, cross-correlation, or the like is used for detecting the sync portion. Whatever method is used, a determination is made as to whether a pattern in the received signal is identical to the known sync portion pattern. Ordinarily, the identicalness is confirmed using almost the entire sync portion, in order to increase the noise resistance. Note that because the preamble portion is also a known specific pattern, it is also possible to include several samples from the rear half of the preamble portion in the confirmation of identicalness. The sync detection portion 42 then outputs, as a timing signal that indicates the starting position of the sync portion, a position that has been determined to be the most identical.

The delay buffer 43 imposes a delay at the time that the sync detection portion 42 detects the sync portion, such that the received signal that will be output will become the data at the start of the sync portion. Specifically, the delay buffer 43 imposes the delay until the sync detection portion 42 determines that the sync portion has been detected, such that the start of the sync portion will be output.

The delay element 44 delays the received signal by one data sample. The adder 45 performs processing that subtracts the received signal that is output by the delay buffer 43 from the received signal that is delayed by one data sample by the delay element 44. The processing is equivalent to a determination of the bias of the received signal, characterized by emphasizing the high-range frequencies, and operates as a differential filter between the delay element 44 and the adder 45.

The half sampling portion 46 decimates the data once out of every two data samples and outputs the decimated data. Specifically, the half sampling portion 46, starting from the point when the sync portion is detected by the sync detection portion 42, discards the data in the even-numbered samples from the received signal. The received signal from which the data have been discarded by the half sampling portion 46 is sent to the adaptive equalization portion 47.

The adaptive equalization portion 47 is a learning type of equalization circuit that is configured from a FIR filter and a learning circuit. Based on the timing signal that has been output by the sync detection portion 42 and that indicates the starting position of the sync portion, the adaptive equalization portion 47 compares the received signal to an internally stored synchronization pattern. The adaptive equalization portion 47 then adjusts a tap coefficient of the FIR filter such that the error is reduced. The adaptive equalization portion 47 may use a normalized least mean squares (NLMS) algorithm, for example, as a learning algorithm for adjusting the tap coefficient. The received signal that has been equalized by the adaptive equalization portion 47 is sent to the binary determination portion 48.

The binary determination portion 48 converts the received signal into NRZ code by determining whether the codes in the received signal that has been equalized by the adaptive equalization portion 47 are positive or negative.

Configuring the receiving circuit 13 in this way makes it possible to perform adaptive equalization that can improve more complex frequency characteristics without increasing the number of taps of the FIR filter.

The configuration of the receiving circuit 13 that is contained in a reader/writer 10 according to the embodiment of the present invention has been explained above using FIG. 4. Next, another configuration of the receiving circuit 13 that is contained in a reader/writer 10 according to the embodiment of the present invention will be explained.

Figure 5:
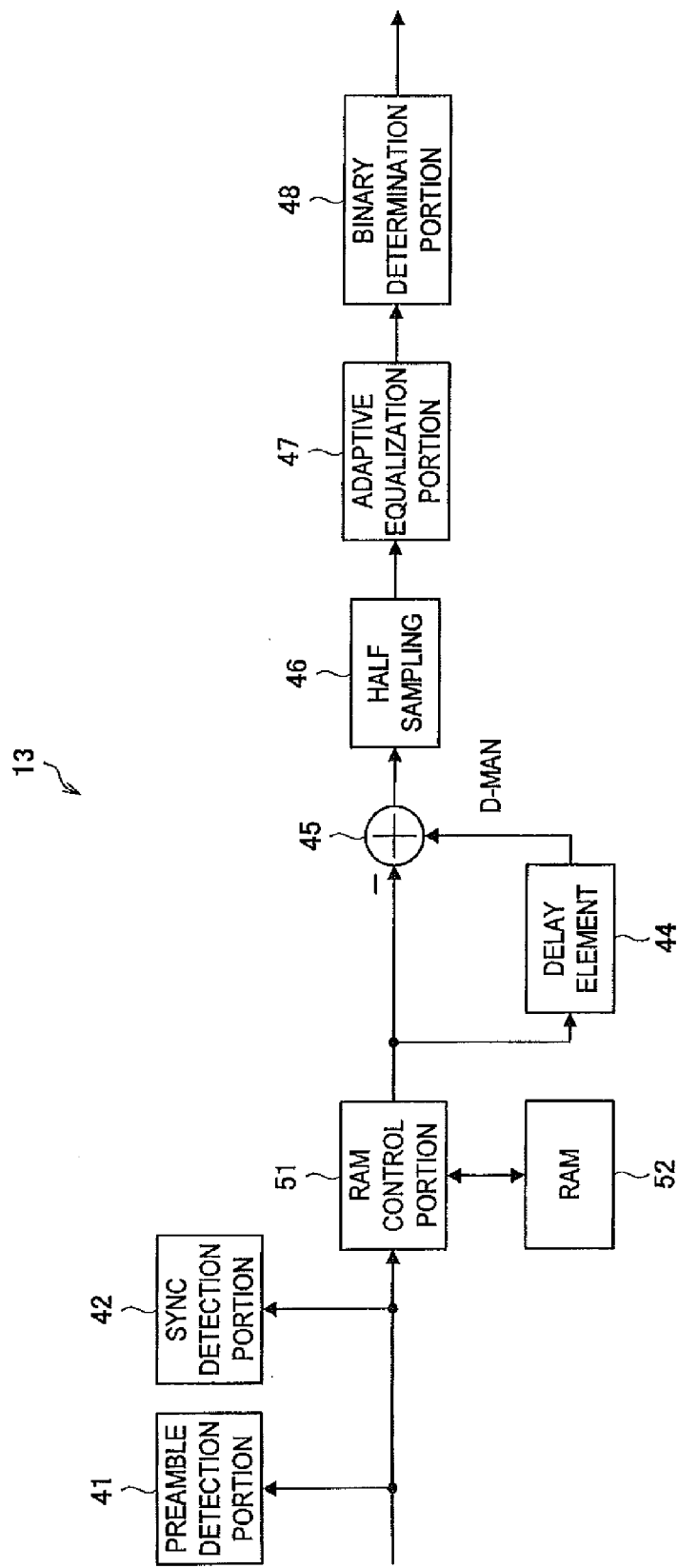
FIG. 5 is an explanatory figure that shows another configuration of the receiving circuit 13 that is contained in the reader/writer 10 according to the embodiment of the present invention.

FIG. 5 is an explanatory figure that shows the other configuration of the receiving circuit 13 that is contained in a reader/writer 10 according to the embodiment of the present invention. Hereinafter, the other configuration of the receiving circuit 13 that is contained in a reader/writer 10 according to the embodiment of the present invention will be explained using FIG. 5.

In the receiving circuit 13 that is shown in FIG. 4, the half sampling is performed prior to the adaptive equalization. This cuts in half the number of bits in the sync portion that are used for learning the tap coefficient in the adaptive equalization. Therefore, cases occur in which the tap coefficient convergence performance deteriorates. The receiving circuit 13 that is shown in FIG. 5 is configured such that it does not worsen the tap coefficient convergence performance.

As shown in FIG. 5, the receiving circuit 13 is configured such that it includes the preamble detection portion 41, the sync detection portion 42, the delay element 44, the adder 45, the half sampling portion 46, the adaptive equalization portion 47, the binary determination portion 48, a RAM control portion 51, and a RAM 52.

The points that are different from the configuration that is shown in FIG. 4 are that the RAM control portion 51 and the RAM 52 are provided instead of the delay buffer 43.

The RAM control portion 51 writes to the RAM 52 the received signal that is sent from the sync detection portion 42, reads, at a specified timing, the received signal that has been written to the RAM 52, and outputs the signal to a circuit at a subsequent stage.

Figure 16:
FIG. 16 is an explanatory figure that shows a data sequence that is output from a RAM control portion 51 to a circuit at a subsequent stage in a case where a number of times that the sync portion is read is two.

Starting from the point when the sync portion is detected by the sync detection portion 42, the RAM control portion 51 stores an address where the starting data in the sync portion are stored. Then, when the final data from the sync portion are output, the RAM control portion 51 once again sets the read address to the address where the starting data in the sync portion are stored and reads the sync portion. When the reading of the sync portion has been performed a number of times that is set in advance, the RAM control portion 51 reads the data portion. FIG. 16 is an explanatory figure that shows a data sequence that is output from the RAM control portion 51 to the circuit at the subsequent stage in a case where a number of times that the sync portion is read is two.

Configuring the receiving circuit 13 such that the sync portion is stored in the RAM 52 and is read the number of times that is set in advance, such that the tap coefficient is learned the number of times that the sync portion is read, makes it possible to sustain the tap coefficient convergence performance even if the number of taps is cut in half in conjunction with the half sampling.

However, even in a case where the receiving circuit 13 is provided with the RAM control portion 51 and the RAM 52 in this manner, cases will occur in which the receiving performance will become worse if the synchronization position in the sync detection portion 42 shifts due to the effects of the frequency characteristics of the transmission route or the like. Hereinafter, a case in which the synchronization position in the sync detection portion 42 has shifted, and the receiving performance in that case, will be explained.

Figure 6:
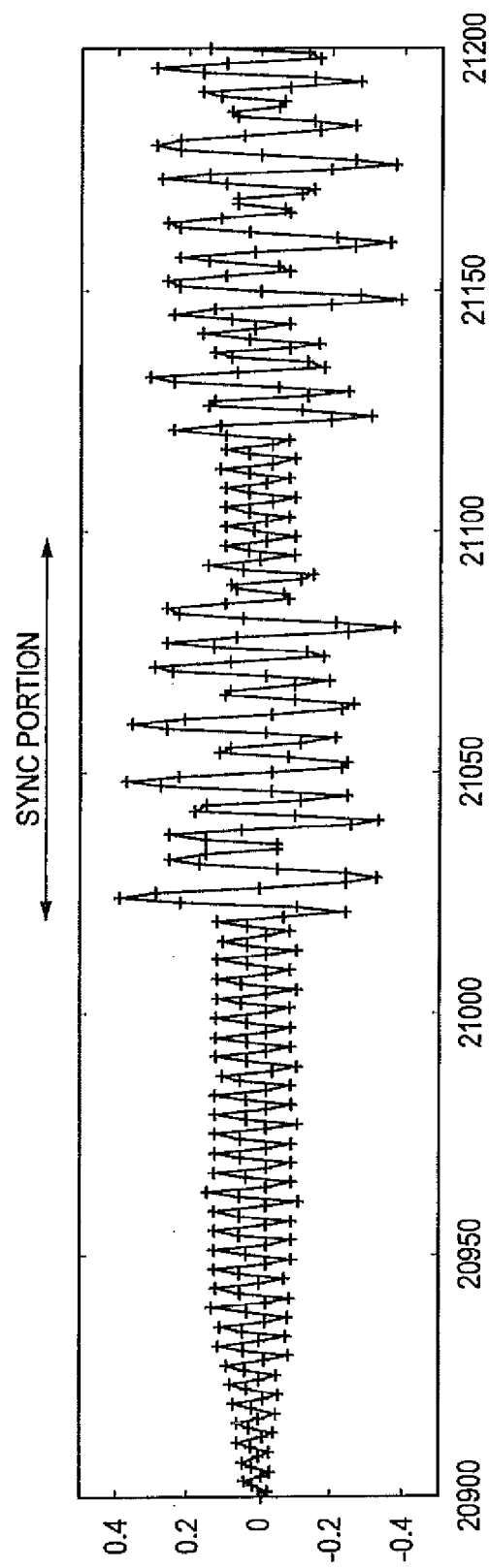
FIG. 6 is an explanatory figure that shows an example of a waveform of a received signal that is affected by frequency characteristics of a transmission route.
Figure 7:
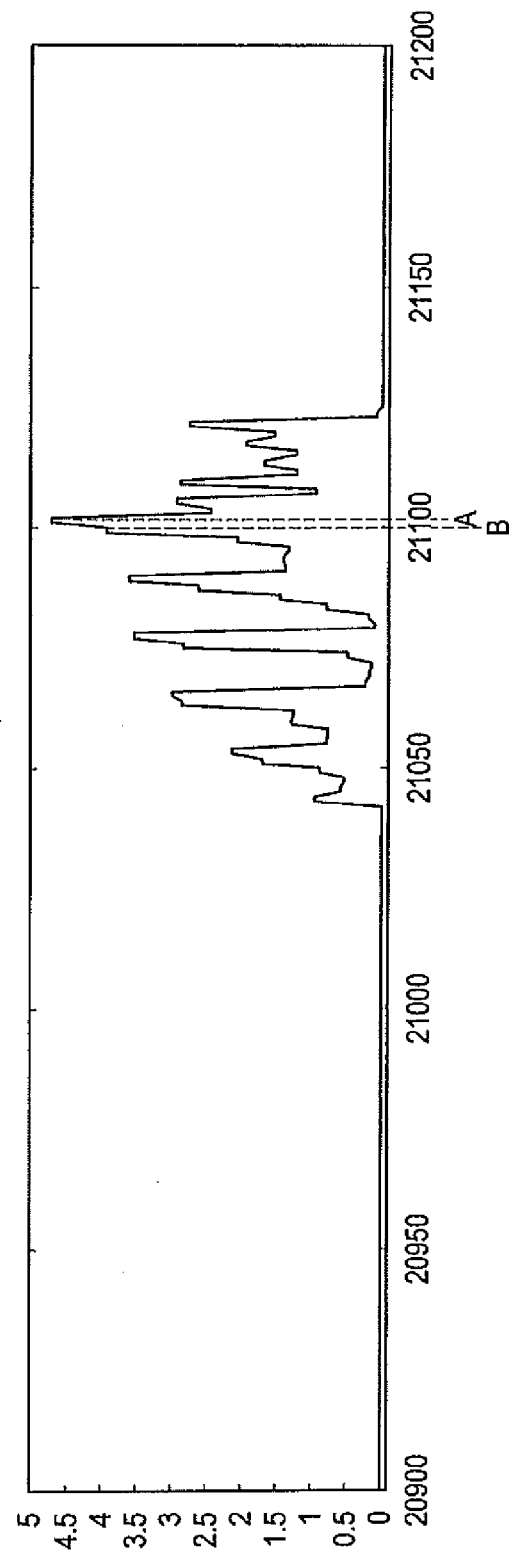
FIG. 7 is an explanatory figure that shows an example of cross-correlation values for the received signal, a preamble portion (four bits), and a sync portion (sixteen bits)

FIG. 6 is an explanatory figure that shows an example of the waveform of the received signal when it is affected by the frequency characteristics of the transmission route. FIG. 7 is an explanatory figure that shows an example of cross-correlation values for the received signal, the preamble portion (four bits), and the sync portion (sixteen bits).

It can be seen from the cross-correlation values that is shown in FIG. 7 that there exist a position A where the cross-correlation value is the highest and a position B that is one sample prior to the position A and where the cross-correlation value is the second highest. In this case, the position B is essentially the correct synchronization position, but the position A has the higher cross-correlation value. In a case where the frequency characteristics of the transmission route are flat, it is possible for the synchronization position to be uniquely identified based on the cross-correlation results, but if the amplitude and the phase are affected by the frequency characteristics, cases will occur in which a high correlation value is seen at a position that is shifted by one sample, with the correlation value being higher than that of the actual position.

Figure 8:
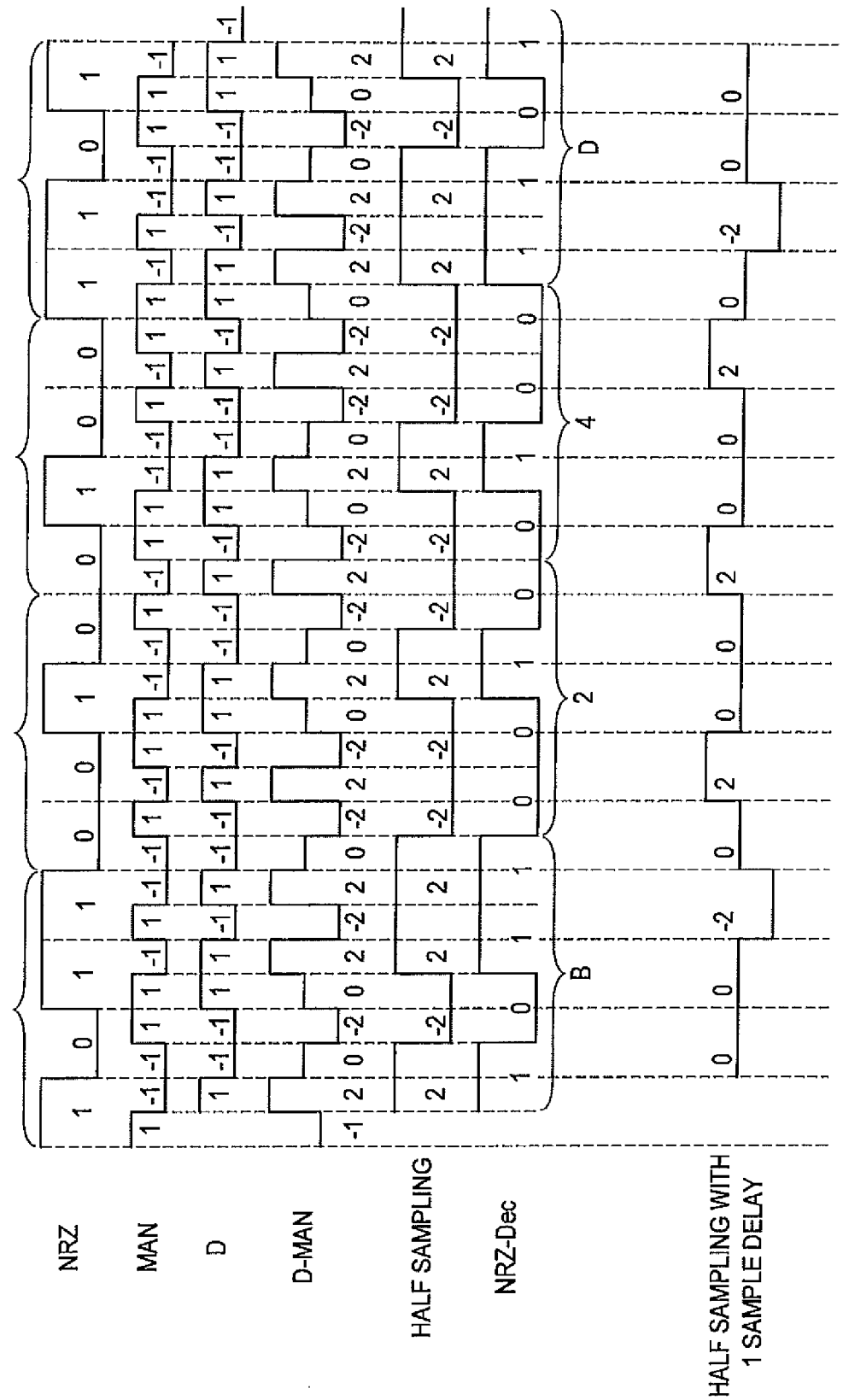
FIG. 8 is an explanatory figure that shows a procedure that decodes Manchester encoded data.

As described previously, in the receiving circuit 13, the bias of the received signal is computed, and the half sampling is performed starting from the synchronization position. FIG. 8 is an explanatory figure that shows a procedure that decodes the Manchester encoded data.

The transmission data "1, 0, 1, 1, 0, 0, 1, 0, 0, 1, 0, 0, 1, 1, 0, 1" in NRZ code is Manchester encoded, and the transmission signal "1, −1, −1, 1, 1, −1, 1, −1, −1, 1, −1, 1, 1, −1, −1, 1, −1, 1, 1, −1, −1, 1, −1, 1, 1, −1, 1, −1, −1, 1, 1, −1" in Manchester code is transmitted.

The received signal is received having been affected by the frequency characteristics of the transmission route, and it is converted into quantized values by being passed through an A/D converter, but for simplicity's sake, a process will be explained in which the signal is processed as the two values "1" and "−1" without any variation in the characteristics. That is, the Manchester encoded data in the transmission signal are the same as the Manchester encoded data in the received signal. When a delayed signal D that has been delayed by one clock cycle is subtracted from the Manchester encoded received signal, a signal (D-MAN) is produced in the form of "−1, 2, 0, −2, 0, 2, −2, 0, −2, 2, −2, 0, 2, 0, −2, 2, −2, 0, 2, 0, −2, 2, −2, 0, 2, −2, 2, 0, −2, 0, 2".

Next, the half sampling is performed starting from the synchronization position, such that the signal becomes "2, −2, 2, 2, −2, −2, 2, −2, −2, 2, −2, −2, 2, 2, −2, 2". Next, the waveform is ordinarily equalized by adaptive equalization, but in this case, the effects of the frequency characteristics of the transmission route are not taken into account, so the decoding can be done even without the equalization. Next, the signal is decoded from positive and negative values into "1, 0, 1, 1, 0, 0, 1, 0, 0, 1, 0, 0, 1, 1, 0, 1" in NRZ code. It can be seen that the decoded NRZ data are the same as the NRZ transmission data and that the signal was received correctly.

Now consider a case in which a position that is delayed by one sample becomes the synchronization position. Basically, a bias is always present, because the Manchester encoding encodes the NRZ data "0" as "01" and the data "1" as "10", but in the case of a position that is delayed by one sample, a mirror bias of the subsequent data is assessed. It is uncertain whether the subsequent data are "0" or "1", so a state in which the bias is zero, neither positive nor negative, can also exist, meaning that three values are possible. Thus, as shown in FIG. 8, the result of the half sampling in a case where the synchronization position has shifted by one sample is "0, 0, −2, 0, 2, 0, 0, 2, 0, 0, 2, 0, −2, 0, 0". The adaptive equalization that is performed at a later stage is a method that equalizes the received signal into the two values of "+1" and "−1", so it is difficult to properly equalize a signal with three values that are created by the shift in the synchronization as described above. For the same sort of reasons, it is also difficult to properly equalize a signal for which the synchronization position has been shift ahead by one sample.

Figure 9:
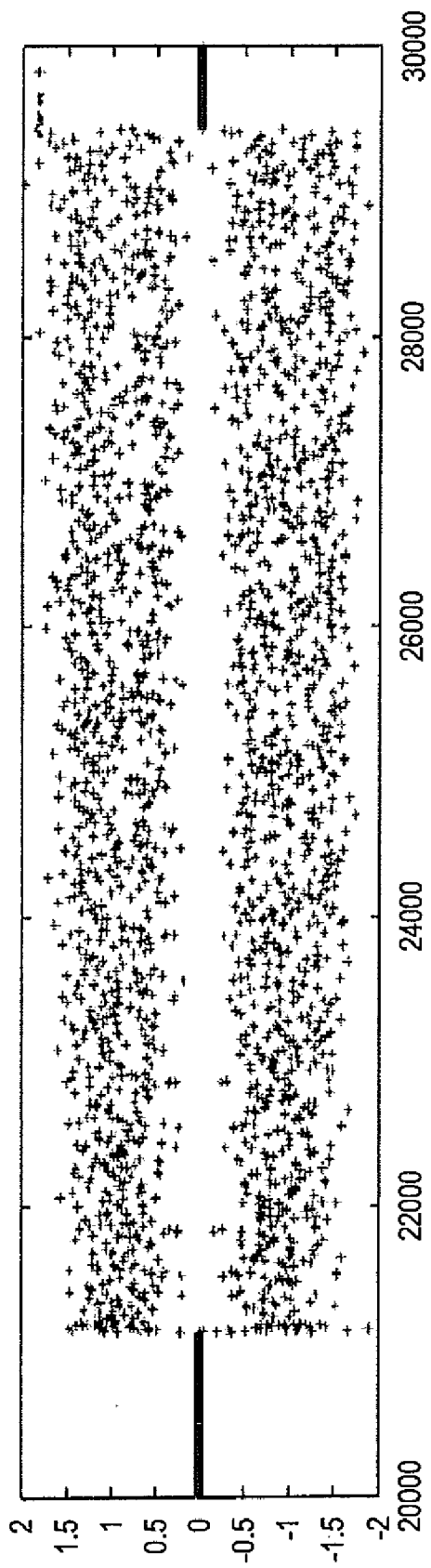
FIG. 9 is an explanatory figure that shows a point distribution for an equalized signal in a case where a position A in FIG. 7 has been made a synchronization position.
Figure 10:
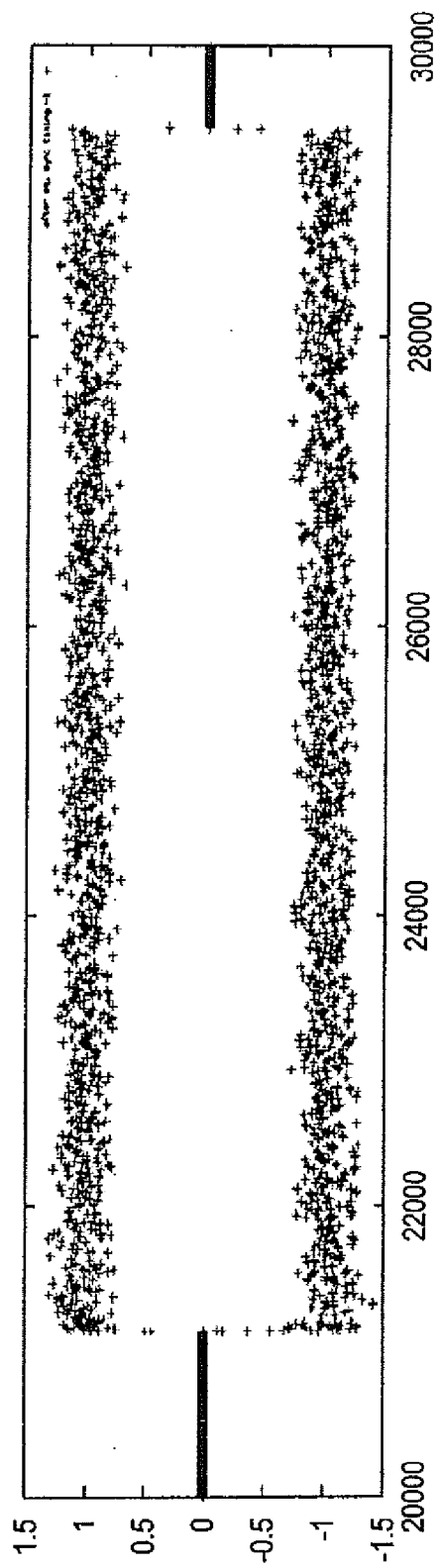
FIG. 10 is an explanatory figure that shows a point distribution for an equalized signal in a case where a position B in FIG. 7 has been made a synchronization position.

FIG. 9 is an explanatory figure that shows a point distribution for the equalized signal in a case where the position A in FIG. 7 has been made the synchronization position. FIG. 10 is an explanatory figure that shows a point distribution for the equalized signal in a case where the position B in FIG. 7 has been made the synchronization position. It can be seen from the point distributions that are shown in FIGS. 9 and 10 that the correlation values are higher for the position A in FIG. 7, but because it is not the correct synchronization position, the equalization error is greater.

Thus, in a non-contact communication system that utilizes electromagnetic coupling, cases will occur in which the detected synchronization position shifts due to effects of the frequency characteristics of the transmission route, and the shift in the detected synchronization position becomes a factor that impairs the equalization performance.

Accordingly, in the present embodiment, a plurality of synchronization positions with high correlation values are selected in the receiving circuit, training equalization of the sync portion is performed for each of the synchronization positions, the equalized signal point errors are compared for each of the candidate positions, and tracking equalization of the data portion is performed for the synchronization position that has the smallest error. This makes it possible, in a non-contact communication system that utilizes electromagnetic coupling, to identify a good synchronization position among the plurality of the synchronization position candidates, and to perform the equalization, even in a case where the position with the highest correlation value is not the correct synchronization position.

Hereinafter, another configuration of the receiving circuit 13 that is contained in the reader/writer 10 according to the embodiment of the present invention will be explained.

Figure 11:
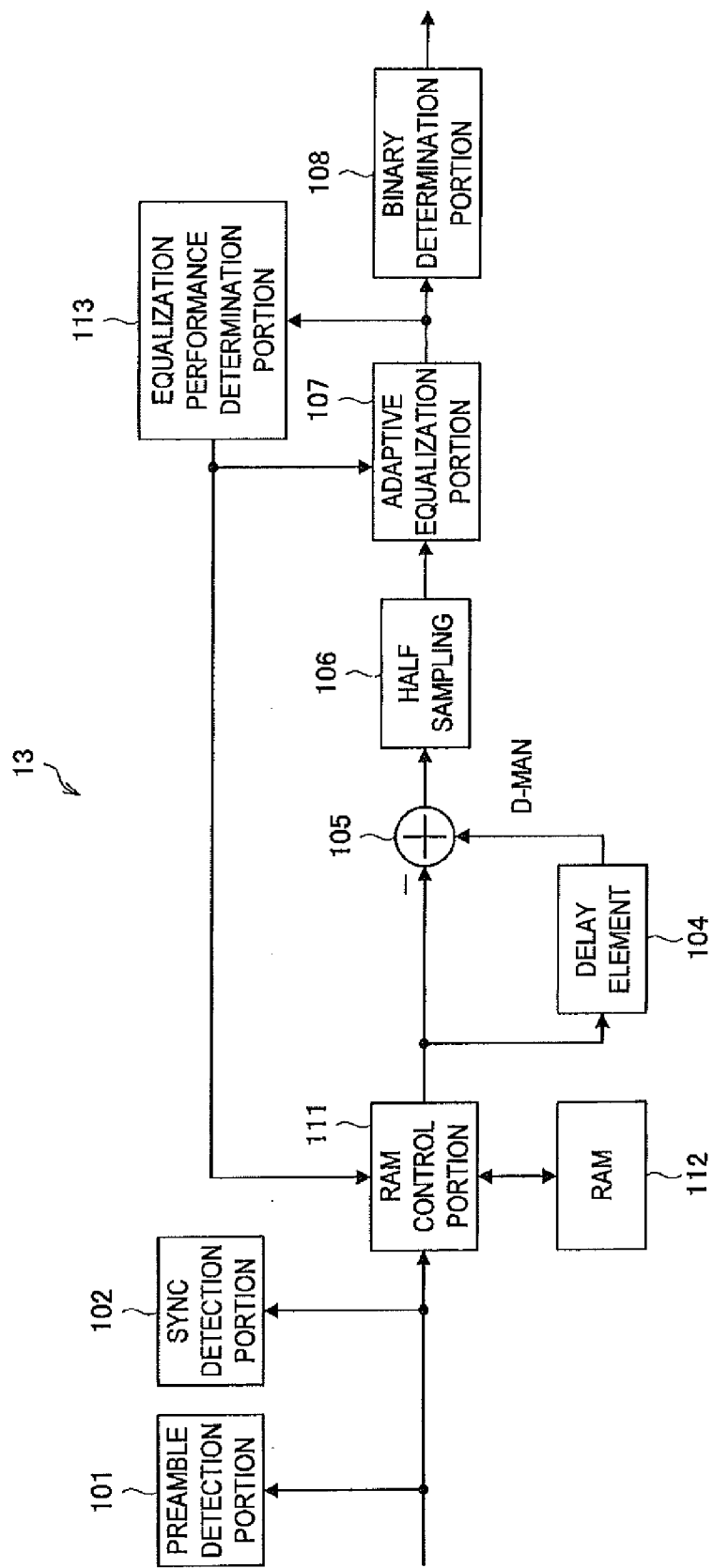
FIG. 11 is an explanatory figure that shows another configuration of the receiving circuit 13 that is contained in the reader/writer 10 according to the embodiment of the present invention.

FIG. 11 is an explanatory figure that shows another configuration of the receiving circuit 13 that is contained in the reader/writer 10 according to the embodiment of the present invention. Hereinafter, the configuration of the receiving circuit 13 according to the embodiment of the present invention will be explained using FIG. 11.

As shown in FIG. 11, the receiving circuit 13 according to the embodiment of the present invention is configured such that it includes a preamble detection portion 101, a sync detection portion 102, a delay element 104, an adder 105, a half sampling portion 106, an adaptive equalization portion 107, a binary determination portion 108, a RAM control portion 111, a RAM 112, and an equalization performance determination portion 113.

The preamble detection portion 101 detects the preamble portion, which is a sequential waveform within the received signal. The preamble detection portion 101 also performs timing synchronization by extracting a sampling timing based on the sequential waveform.

The sync detection portion 102 performs the frame synchronization by detecting the sync portion, which is a specific pattern, based on the received signal and the sampling timing that has been extracted by the preamble detection portion 101. Generally, a method such as pattern matching, cross-correlation, or the like is used for detecting the sync portion. Whatever method is used, a determination is made as to whether a pattern in the received signal is identical to the known sync portion pattern. Ordinarily, the identicalness is confirmed using almost the entire sync portion, in order to increase the noise resistance. Note that because the preamble portion is also a known specific pattern, it is also possible to include several samples from the rear half of the preamble portion in the confirmation of identicalness. The sync detection portion 102 then outputs, as a timing signal that indicates the starting position of the sync portion, a position that has been determined to be the most identical.

The sync detection portion 102 then outputs, as a timing signal that indicates the starting position of the sync portion, a peak position of the correlation value that has been determined to be the most identical. Moreover, if the second highest correlation value is not less than a certain threshold value, the sync detection portion 102 also outputs a flag signal that indicates the existence of a second candidate and a position signal for the second candidate.

The RAM control portion 111 writes to the RAM 112 the received signal that is sent from the sync detection portion 102, reads, at a specified timing, the received signal that has been written to the RAM 112, and outputs the signal to a circuit at a subsequent stage.

Starting from the point when the sync portion is detected by the sync detection portion 102, the RAM control portion 111 stores an address where the starting data in the sync portion are stored. Then, when the final data from the sync portion are output, the RAM control portion 111 once again sets the read address to the address where the starting data in the sync portion are stored and reads the sync portion. When the reading of the sync portion has been performed a number of times that is set in advance, the RAM control portion 111 reads the data portion.

In a case where the flag signal that indicates the existence of a second candidate for the synchronization position has been input from the sync detection portion 102, the RAM control portion 111, after reading the sync portion that is stored in the RAM 112 based on the first candidate position, changes the read address to match the second candidate position and again reads the sync portion that is stored in the RAM 112.

Figure 12:
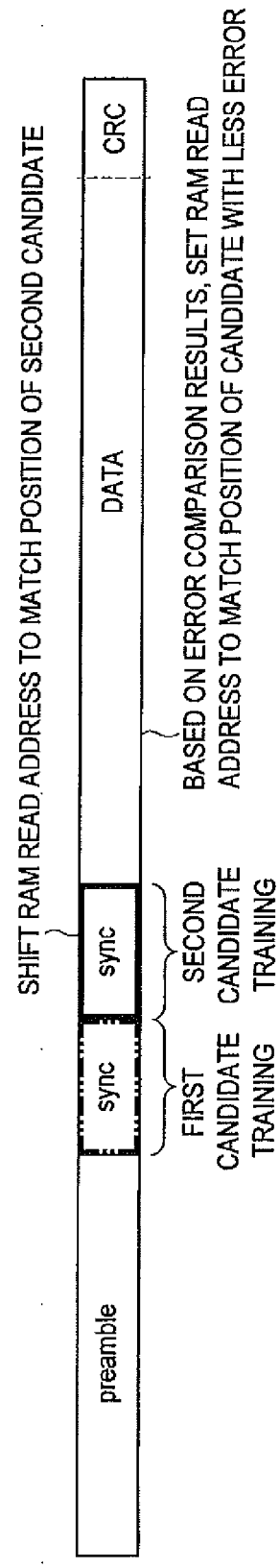
FIG. 12 is an explanatory figure that shows an example of sync portions that are read by a RAM control portion 111.

FIG. 12 is an explanatory figure that shows an example of the sync portions that are read by a RAM control portion 111. FIG. 12 illustrates a case in which, when there are two candidates for the synchronization position, the RAM control portion 111 reads the sync portion for the first candidate and the sync portion for the second candidate.

The delay element 104 delays the received signal by one data sample. The adder 105 performs processing that subtracts the received signal that is output by the RAM control portion 111 from the received signal that is delayed by one data sample by the delay element 104. The processing is equivalent to a determination of the bias of the received signal, characterized by emphasizing the high-range frequencies, and operates as a differential filter between the delay element 104 and the adder 105.

The half sampling portion 106 decimates the data once out of every two data samples and outputs the decimated data. Specifically, the half sampling portion 106, starting from the point when the sync portion is detected by the sync detection portion 102, discards the data in the even-numbered samples from the received signal. The received signal from which the data have been discarded by the half sampling portion 106 is sent to the adaptive equalization portion 107.

Note that in a case where there are two candidates for the synchronization position, the half sampling portion 106 discards the even-numbered samples from the received signal starting from the first candidate position in the first candidate sync portion that was read by the RAM control portion 111, then discards the even-numbered samples from the received signal starting from the second candidate position in the second candidate sync portion.

The adaptive equalization portion 107 is a learning type of equalization circuit that is configured from a FIR filter and a learning circuit. Based on the timing signal that has been output by the sync detection portion 102 and that indicates the starting position of the sync portion, the adaptive equalization portion 107 compares the received signal to an internally stored synchronization pattern. The adaptive equalization portion 107 then adjusts the tap coefficient of the FIR filter such that the error is reduced. The adaptive equalization portion 107 may use an NLMS algorithm, for example, as a learning algorithm for adjusting the tap coefficient.

In a case where a second candidate for the synchronization position exists, the adaptive equalization portion 107 compares the sync portion for the first candidate to the internally stored synchronization pattern and performs training equalization that trains the tap coefficient of the FIR filter using an NLMS algorithm, for example. The adaptive equalization portion 107 also outputs the equalized signal for the sync portion to the equalization performance determination portion 113. The tap coefficient that has been trained for the first candidate is stored in a temporary register (not shown in the drawings), after which the tap coefficient is initialized. Next, the adaptive equalization portion 107 compares the sync portion for the second candidate to the internally stored synchronization pattern and once again performs the training equalization that trains the tap coefficient of the FIR filter. The adaptive equalization portion 107 also outputs the equalized signal for the sync portion for the second candidate to the equalization performance determination portion 113. Thus, in a case where a plurality of candidates for the synchronization position exist, the performing by the adaptive equalization portion 107 of the training equalization that trains the tap coefficient of the FIR filter for each of the plurality of the candidates makes it possible for the receiving circuit 13 to seek out the most suitable synchronization position among the plurality of candidates for the synchronization position.

The binary determination portion 108 converts the received signal into NRZ code by determining whether the codes in the received signal that has been equalized by the adaptive equalization portion 107 are positive or negative.

The equalization performance determination portion 113 searches for errors between the synchronization pattern and the equalized signal points. When an equalization error is found, generally the mean square error is used. In a case where a second candidate for the synchronization position exists, the equalization performance determination portion 113 searches for the equalization errors for the first candidate and the equalization errors for the second candidate, then compares the equalization error values at the point when the training is completed for each of the candidates. The equalization performance determination portion 113 then sets the candidate with the lower error value as the most suitable synchronization position.

Figure 13:
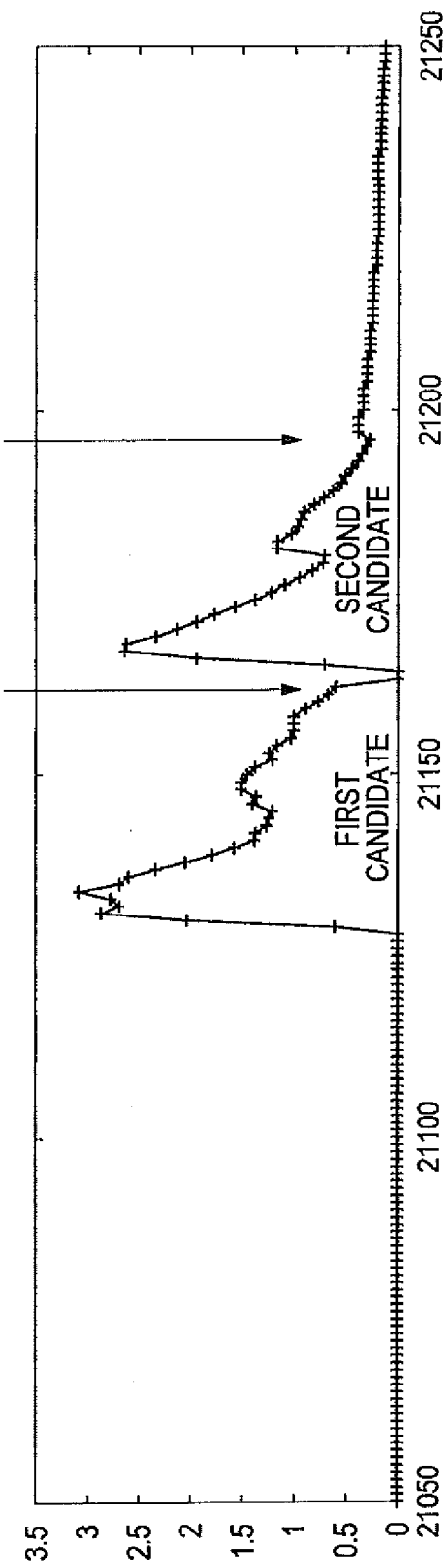
FIG. 13 is an explanatory figure that shows an example of equalization error values for a first candidate and a second candidate that are derived from mean square errors.

FIG. 13 is an explanatory figure that shows an example of equalization error values for the first candidate and the second candidate that are derived from the mean square errors. In the example that is shown in FIG. 13, a comparison of the equalization error values at the point when the training is completed for each of the candidates shows that the error value for the second candidate is lower. Accordingly, the equalization performance determination portion 113 provides notification to the RAM control portion 111 and the adaptive equalization portion 107 that the second candidate is the most reliable synchronization position.

When the RAM control portion 111 finishes reading the sync portions for the first candidate and the second candidate, it starts reading the data portion, but at that time, the RAM control portion 111 determines, based on the information it has received from the equalization performance determination portion 113, whether to start reading the data portion from the synchronization position for the first candidate or to start reading from the synchronization position for the second candidate.

Furthermore, when the adaptive equalization portion 107 finishes the training for the first candidate and the second candidate, the adaptive equalization portion 107 starts the tracking equalization for the data portion. At that time, the adaptive equalization portion 107 determines, based on the information it has received from the equalization performance determination portion 113, whether to start the tracking equalization based on the tap coefficient that was trained for the first candidate, and that is stored in the temporary register (not shown in the drawings), or to start the tracking equalization based on the tap coefficient that was trained for the second candidate.

Configuring the receiving circuit 13 in this manner makes it possible to determine the best synchronization position among a plurality of synchronization position candidates and to perform the equalization, even in a case where the position with the highest correlation value is not the correct synchronization position. Note that in the receiving circuit 13 described above, the half sampling portion 106 decimates the data once out of every two data samples and outputs the decimated data. Therefore, the sync detection portion 102 may identify, as the sync portion candidates, a plurality of sampled positions that are one of adjacent and spaced at even-numbered intervals.

The configuration of the receiving circuit 13 that is contained in the reader/writer 10 according to the embodiment of the present invention has been explained above using FIG. 11. Note that the configuration of the receiving circuit 13 that is contained in the reader/writer 10 has been explained, but the explanation may also be applied to the receiving circuit in the non-contact IC card 30, which as the same configuration. Next, the operation of the receiving circuit 13 that is shown in FIG. 11 and that is contained in the reader/writer 10 according to the embodiment of the present invention will be explained.

1-4. Operation of Receiving Circuit

Figure 14:
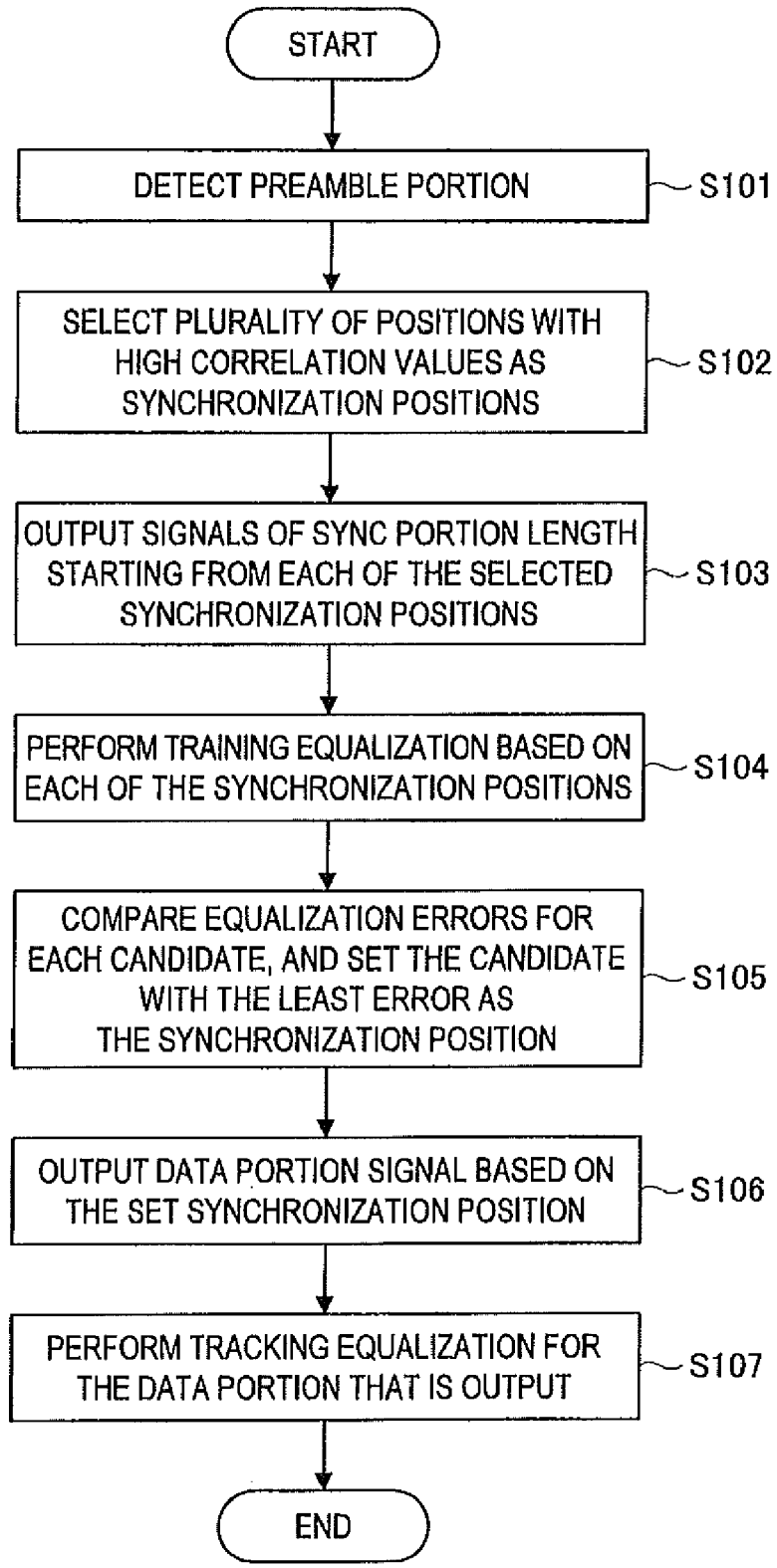
FIG. 14 is a flowchart that shows the operation of the receiving circuit 13 that is contained in the reader/writer 10 according to the embodiment of the present invention.

FIG. 14 is a flowchart that shows the operation of the receiving circuit 13 that is contained in the reader/writer 10 according to the embodiment of the present invention. Hereinafter, the operation of the receiving circuit 13 according to the embodiment of the present invention will be explained using FIG. 14.

First, the preamble detection portion 101 performs processing that detects the preamble portion, which is a sequential waveform within the received signal that the reader/writer 10 has received (Step S101).

After the preamble detection portion 101 detects at Step S101 the preamble portion in the received signal that the reader/writer 10 has received, the sync detection portion 102 detects the sync portion, which is a specific pattern, based on a sampling timing that the preamble detection portion 101 has extracted. However, if a plurality of positions have correlation values that are not less than a certain threshold value, the sync detection portion 102 selects the plurality of the positions with the high correlation values as the synchronization positions (Step S102). When a plurality of synchronization positions are selected, the sync detection portion 102 may, for example, output the flag signal that indicates that a synchronization position candidate exists and the position signal for the candidate.

When the sync detection portion 102 selects a plurality of positions with high correlation values as the synchronization positions at Step S102, for each one of the synchronization positions, the RAM control portion 111 reads, from the RAM 112 where the received signal is stored, a signal of the length of the sync portion, starting from the synchronization position (Step S103).

For each one of the signals of the length of the sync portion that are read, their number being equal to the number of the synchronization positions that have been selected, the bias is determined by the delay element 104 and the adder 105, and the half sampling portion 106 performs the processing that decimates the data once out of every two data samples. Then the adaptive equalization portion 107 performs the training equalization for each one of the signals for which the half sampling portion 106 has performed the processing that decimates the data once out of every two data samples (Step S104).

For example, in a case where the sync detection portion 102 has selected two positions with high correlation values as the synchronization positions, the adaptive equalization portion 107 performs the training equalization based on the first candidate synchronization position, which has the highest correlation value, then stores the tap coefficient for the FIR filter in the temporary register (not shown in the drawings). Next, the adaptive equalization portion 107 performs the training equalization based on the second candidate synchronization position, which has the next highest correlation value.

After the adaptive equalization portion 107 has performed the training equalization at Step S104 for each one of the signals for which the half sampling portion 106 has performed the processing that decimates the data once out of every two data samples, the equalization performance determination portion 113 compares the equalization errors for each one of the candidates and sets the candidate with the least error as the synchronization position (Step S105). Information on the synchronization position that the equalization performance determination portion 113 has set is sent to the RAM control portion 111 and the adaptive equalization portion 107.

Based on the information that the equalization performance determination portion 113 has sent about the synchronization position that the equalization performance determination portion 113 set at Step S105, the RAM control portion 111 reads the received signal from the RAM 112 and outputs the data portion as a signal (Step S106).

For the data portion signal that the RAM control portion 111 reads from the RAM 112 and outputs at Step S106, the bias is determined by the delay element 104 and the adder 105, and the half sampling portion 106 performs the decimation processing. Then, based on the information that the equalization performance determination portion 113 has sent about the synchronization position that the equalization performance determination portion 113 set at Step S105, the adaptive equalization portion 107 performs the training equalization for the data portion signal for which the half sampling portion 106 has performed the decimation processing (Step S107).

Figure 15:
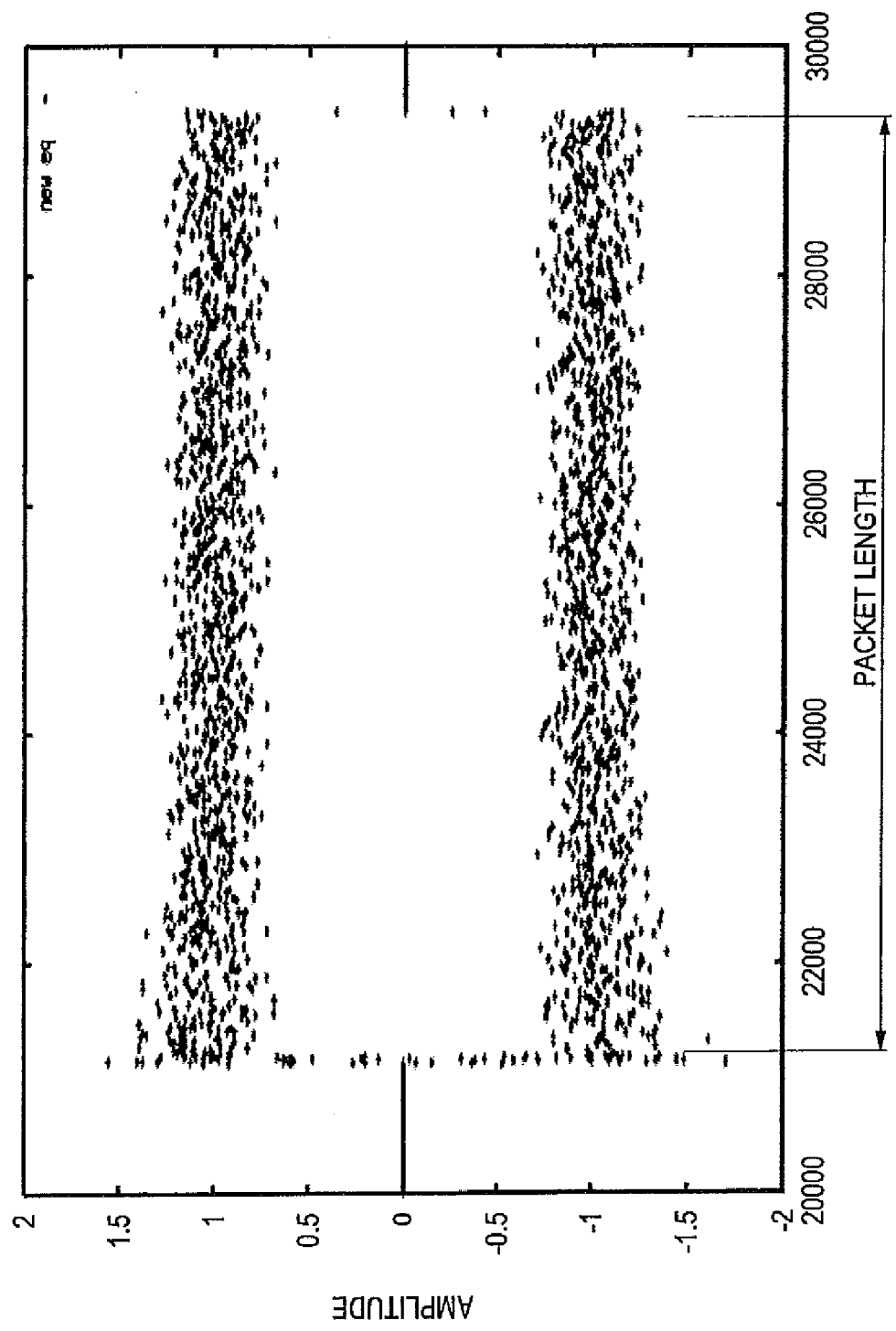
FIG. 15 is an explanatory figure that shows an example of a point distribution for an equalized signal according to the receiving circuit 13 according to the embodiment of the present invention.

FIG. 15 is an explanatory figure that shows an example of a point distribution for the equalized signal according to the receiving circuit 13 according to the embodiment of the present invention. It can be seen that the data portion has been equalized properly by first determining the correct synchronization position based on the training for the first candidate and the second candidate.

The operation of the receiving circuit 13 according to the embodiment of the present invention has been explained above using FIG. 14. Operating the receiving circuit 13 in this manner with respect to the received signal makes it possible to identify a good synchronization position among a plurality of synchronization position candidates and to perform the equalization, even in a case where the position with the highest correlation value is not the correct synchronization position. Furthermore, using the training equalization to identify a good synchronization position among a plurality of synchronization position candidates makes it unnecessary to repeatedly perform a CRC check, making it possible to shorten the time that is required in order to identify the received signal, which in turn makes it possible to shorten the time that is required for the non-contact communication.

2. CONCLUSION

According to the embodiment of the present invention that has been explained above, the adaptive equalization is performed using the existing Felica format and using the sync portion of the packet as the learning bits. This makes it possible to avoid the interchangeability problem and the increase in overhead. Actually, the frame synchronization that uses the sync portion and the adaptive equalization that uses the same sync portion are both implemented by providing a delay buffer within the receiving circuit.

Moreover, in the embodiment of the present invention that is described above, when the adaptive equalization of the half sampled signal is performed and the binary determination is made, a plurality of synchronization positions are selected, the training equalization of the sync portion is performed for each one of the synchronization positions, and the tracking equalization of the data portion is performed for the synchronization position with the least error. This makes it possible to prevent a drop in the receiving performance and to improve the receiving performance, even in a case where the frequency characteristics of the transmission route exert an influence.

Thus, in a non-contact communication system that utilizes electromagnetic coupling, the bandwidth for the received signal is reduced by half by computing the bias of the received signal and performing the half sampling on the receiving side. When the signal is adaptively equalized, it is possible to express more complex frequency characteristics while maintaining the same number of FIR filter taps. Furthermore, to counter the impairment of the equalization performance that is caused by a shift in the synchronization position, it is possible to identify a good synchronization position among a plurality of synchronization positions and to perform the equalization starting from the identified synchronization position, so the equalization is performed well, and the receiving performance is improved.

It should be understood by those skilled in the art that various modifications, combinations, sub-combinations and alterations may occur depending on design requirements and other factors insofar as they are within the scope of the appended claims or the equivalents thereof.

For example, in the embodiment that is described above, the explanation focused on an embodiment that applies the present invention to a non-contact communication system that conforms to the NFC IP-1 standard, but the present invention is not limited to this application. The same invention can also be applied to communication systems that conform to various types of standards and that perform communication utilizing modulation that is accomplished by switching the change direction of an electric load.

What is claimed is:

1. An information processing device, comprising:
a preamble detection portion that detects, within a received signal, a preamble portion that includes a sequential waveform, and that extracts a sampling timing based on the sequential waveform;
a sync detection portion that, based on the sampling timing, detects within the received signal a plurality of sync portion candidates that include a specific pattern that fulfills a specified condition, and that outputs a timing signal that indicates a starting position of the sync portion;
a storage portion that stores the received signal;
a storage control portion that controls the storing of the received signal in the storage portion and reading of the received signal from the storage portion;
a delay time imparting portion that imparts a delay to the received signal that the storage control portion reads from the storage portion, such that the beginning of the sync portion is not output until the detection of the sync portion by the sync detection portion has been determined;

a bias computation portion that computes a difference between the received signal to which the delay has been imparted by the delay time imparting portion and the received signal to which an additional delay time has been imparted that is equivalent to one clock cycle in Manchester code;

a half sampling portion that samples data once out of every two clock cycles in the Manchester code, starting from the beginning of the sync portion for which the bias has been computed by the bias computation portion;

an adaptive equalization portion that, based on the timing signal, performs training equalization using each one of the half sampled sync portion candidates;

an equalization performance determination portion that compares equalization errors for each one of the sync portion candidates for which the training equalization has been performed by the adaptive equalization portion, and that sets the candidate position with the least error; and a binary determination portion that decodes the Manchester code into NRZ code by subjecting to binary determination the received signal that has been adaptively equalized by the adaptive equalization portion, wherein the storage control portion reads the received signal from the storage portion based on information about the candidate position with the least error that has been set by the equalization performance determination portion.

2. The information processing device according to claim 1, wherein the adaptive equalization portion performs adaptive equalization of a data portion that is contained in the received signal and that includes a specific pattern, based on the information about the candidate position with the least error that has been set by the equalization performance determination portion.

3. The information processing device according to claim 1, wherein the sync detection portion detects, as the sync portion candidates, a plurality of sampled positions that are adjacent to one another.

4. The information processing device according to claim 1, wherein the sync detection portion detects, as the sync portion candidates, a plurality of sampled positions that are spaced at even-numbered intervals.

5. The information processing device according to claim 1, wherein the adaptive equalization portion performs training equalization that trains a tap coefficient of a FIR filter.

6. A receiving method, comprising the steps of:

detecting, within a received signal, a preamble portion that includes a sequential waveform, and extracting a sampling timing based on the sequential waveform;

detecting within the received signal, based on the sampling timing, a plurality of sync portion candidates that include a specific pattern, and outputting a timing signal that indicates a starting position of the sync portion;

storing the received signal;

imparting a delay to the received signal, such that the beginning of the sync portion is not output until the detection of the sync portion has been determined;

computing a difference between the received signal to which the delay has been imparted and the received signal to which an additional delay time has been imparted that is equivalent to one clock cycle in Manchester code;

sampling data once out of every two clock cycles in the Manchester code, starting from the beginning of the sync portion for which the bias has been computed;

performing training equalization using each one of the half sampled sync portion candidates, based on the timing signal;

comparing equalization errors for each one of the sync portion candidates for which the training equalization has been performed, and setting the candidate position with the least error;

reading the stored received signal based on the candidate position with the least error that has been set; and subjecting to binary determination the received signal that has been read and adaptively equalized, such that the Manchester code is decoded into NRZ code.

7. A wireless communication system, comprising:

a reader/writer; and an information processing device that performs non-contact communication with the reader/writer by using a carrier wave of a specified frequency, wherein at least one of the reader/writer and the information processing device includes a preamble detection portion that detects, within a received signal, a preamble portion that includes a sequential waveform, and that extracts a sampling timing based on the sequential waveform, a sync detection portion that, based on the sampling timing, detects within the received signal a plurality of sync portion candidates that include a specific pattern that fulfills a specified condition, and that outputs a timing signal that indicates a starting position of the sync portion, a storage portion that stores the received signal, a storage control portion that controls the storing of the received signal in the storage portion and reading of the received signal from the storage portion, a delay time imparting portion that imparts a delay to the received signal that the storage control portion reads from the storage portion, such that the beginning of the sync portion is not output until the detection of the sync portion by the sync detection portion has been determined, a bias computation portion that computes a difference between the received signal to which the delay has been imparted by the delay time imparting portion and the received signal to which an additional delay time has been imparted that is equivalent to one clock cycle in Manchester code, a half sampling portion that samples data once out of every two clock cycles in the Manchester code, starting from the beginning of the sync portion for which the bias has been computed by the bias computation portion, an adaptive equalization portion that, based on the timing signal, performs training equalization using each one of the half sampled sync portion candidates, an equalization performance determination portion that compares equalization errors for each one of the sync portion candidates for which the training equalization has been performed by the adaptive equalization portion, and that sets the candidate position with the least error, and a binary determination portion that decodes the Manchester code into NRZ code by subjecting to binary determination the received signal that has been adaptively equalized by the adaptive equalization portion, and wherein the storage control portion reads the received signal from the storage portion based on information about the candidate position with the least error that has been set by the equalization performance determination portion.

* * * * *